(12) United States Patent  (10) Patent No.: US 8,279,542 B2
Tanaka  (45) Date of Patent: Oct. 2, 2012

(54) OPTICAL DEVICE AND LENS ASSEMBLY

(75) Inventor: Hirokazu Tanaka, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 259 days.

(21) Appl. No.: 12/743,050

(22) PCT Filed: Nov. 18, 2008

(86) PCT No.: PCT/JP2008/070917
§ 371 (c)(1),
(2), (4) Date: May 14, 2010

(87) PCT Pub. No.: WO2009/075168
PCT Pub. Date: Jun. 18, 2009

(65) Prior Publication Data
US 2010/0238559 A1 Sep. 23, 2010

(30) Foreign Application Priority Data
Dec. 11, 2007 (JP) ................. 2007-320090

(51) Int. Cl.
G02B 7/02 (2006.01)
(52) U.S. Cl. ..................................... 359/819
(58) Field of Classification Search .............. 359/664, 359/708, 811, 819; 385/33–35, 74
See application file for complete search history.

(56) References Cited

U.S. PATENT DOCUMENTS
2002/0154872 A1   10/2002  Miyokawa
2003/0077044 A1   4/2003   Sakamoto et al.
2003/0138215 A1*  7/2003   Zhou et al. ............. 385/47
2005/0163423 A1*  7/2005   Wang et al. ............ 385/33
2007/0165981 A1   7/2007   Tanaka et al.

FOREIGN PATENT DOCUMENTS
CN  101004467   7/2007
JP  57-081227   5/1982
JP  01-295210   11/1989
(Continued)

OTHER PUBLICATIONS
International Search Report issued Dec. 16, 2008 in International (PCT) Application No. PCT/JP2008/070917.
(Continued)

Primary Examiner — Joseph P Martinez
(74) Attorney, Agent, or Firm — Wenderoth, Lind & Ponack, L.L.P.

(57) ABSTRACT

An optical device (1) includes: a first capillary tube assembly (2) and a second capillary tube assembly (3), in which capillary tubes (6, 10) into which optical fibers (5, 8 (9)) are inserted and fixed, are retained, respectively, by retaining sleeves (7, 11); and a lens assembly (4) including a first lens (12) and a second lens (13), which are opposed to leading ends (5a, 8a (9a)) of the optical fibers (5, 8 (9)), respectively, through a space; a band pass filter (14) interposed between both lenses (12, 13); and an accommodation member (15) for accommodating those components. At least one of the lens (12) is formed of a spherical portion (12b) and a flat surface portion (12a), the flat surface portion (12a) is formed into an inclined surface, and a center of curvature of the spherical portion (12b) is offset from the optical axis of the optical fiber (5).

28 Claims, 17 Drawing Sheets

FOREIGN PATENT DOCUMENTS

| | | |
|---|---|---|
| JP | 08-304672 | 11/1996 |
| JP | 2002-174748 | 6/2002 |
| JP | 2002-182061 | 6/2002 |
| JP | 2003-121681 | 4/2003 |
| JP | 2003-167159 | 6/2003 |
| JP | 2003-344697 | 12/2003 |
| JP | 2004-271894 | 9/2004 |
| JP | 2005-010372 | 1/2005 |
| JP | 2005-024928 | 1/2005 |
| JP | 2007-193006 | 8/2007 |
| JP | 2007-333798 | 12/2007 |
| JP | 2008-164828 | 7/2008 |
| JP | 2008-170797 | 7/2008 |
| WO | 2007/145014 | 12/2007 |

OTHER PUBLICATIONS

International Preliminary Report on Patentability and Written Opinion of the International Searching Authority issued Aug. 19, 2010 in International (PCT) Application No. PCT/JP2008/070917.

Chinese Office Action issued Aug. 25, 2011 in corresponding Chinese Patent Application No. 200880118105.X w/English translation.

\* cited by examiner

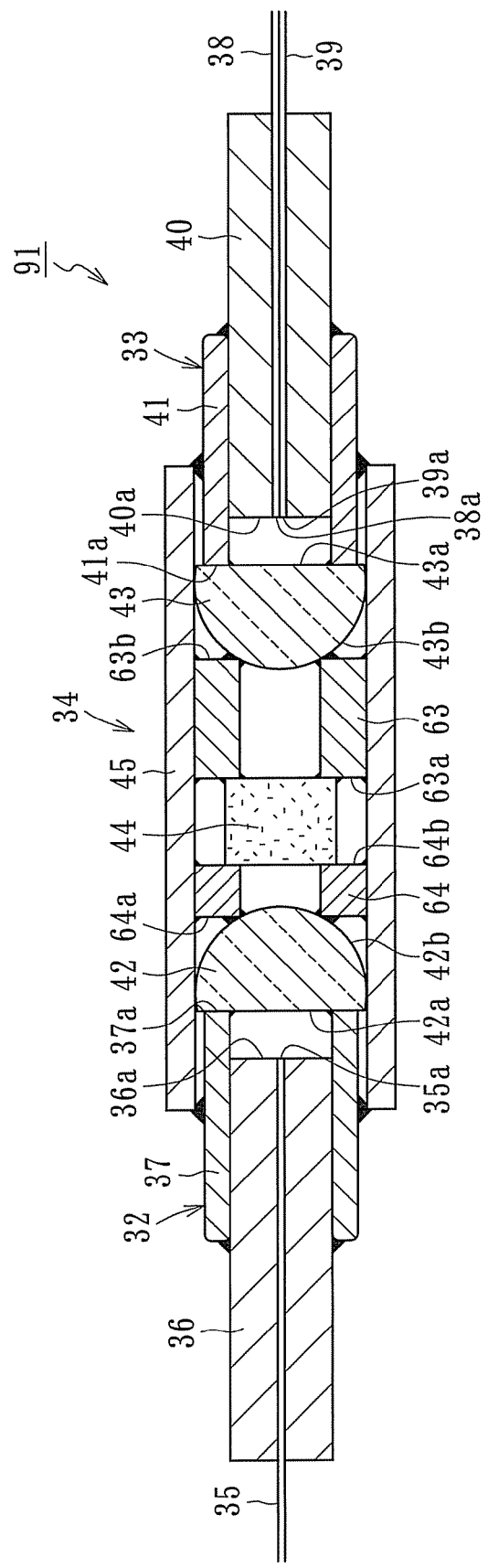

OPTICAL DEVICE AND LENS ASSEMBLY

TECHNICAL FIELD

The present invention relates to an optical device such as an optical multiplexer/demultiplexer, an optical isolator, an optical circulator, an optical switch, and an optical gain equalizer, which are used in an optical communication system, and a lens assembly for use in the optical device.

BACKGROUND ART

As an optical device of this type, there is known an optical device in which two capillary tube/lens assemblies each having a capillary tube, to which an end portion of an optical fiber is fixed, and a lens, which are fixed to a common sleeve by an adhesive or the like, are provided and fixed to an inside of an accommodation member (cylindrical member or cabinet) so that the lenses are opposed to each other through an intermediation of an optical functional component (such as optical filter or optical isolator core) (for example, the following Patent Literatures 1 to 4). The lens has functions of collimating light output from the optical fiber into parallel and of collecting the parallel light to allow the collected light to input into the optical fiber. As the lens, for example, there may be used: a cylindrical lens of a refractive index profile type (so-called GRIN lens: one end is a vertical surface perpendicular to an optical axis, and the another end is an inclined surface in many cases); a cylindrical lens having a uniform refractive index, in which two partial spherical lens surfaces having the same center curvature are provided on both ends (so-called drum lens); a cylindrical lens having the uniform refractive index, in which the partial spherical lens surface is provided on one end (so-called C lens: another end is inclined surface in many cases); and an aspherical lens.

Further, in Patent Literature 5 described below, in order to enable optical axis adjustment between an optical fiber and a lens, a capillary tube assembly in which a capillary tube (ferrule) to which an end portion of the optical fiber is fixed is embedded in a recessed portion of a sleeve and a lens assembly in which a lens fixed to an inside of a cylindrical bush are produced, relative positions of the capillary tube assembly and the lens assembly are adjusted, to thereby perform optical axis adjustment between the optical fiber and the lens, and then an end surface of the sleeve and an end surface of the cylindrical bush are fixed to each other. A leading end surface of the optical fiber and an end surface of the capillary tube retaining the optical fiber is polished to form a spherical shape and the capillary tube is pressed by the sleeve, thereby allowing the leading end surface of the optical fiber to be brought into physical contact (PC contact) with an incident/emission surface of the lens. As the lens, the GRIN lens is used. Besides, a filter serving as the optical functional component is fixed to a member (base member 7b) which is separate from the lens assembly to be interposed between lens assemblies which are opposed to each other.

Further, in the following Patent Literature 6, various optical components such as a band pass filter and the optical isolator are each fixed to a separate cylindrical sleeve having an outer diameter corresponding thereto, to thereby produce a plurality of elements. Using a marker for position alignment formed on the cylindrical sleeve of the respective elements, the respective elements are aligned in positions with each other to be laminated and fixed (cylindrical main body). Then, the capillary tube assembly (ferrule assembly) is subjected to optical axis adjustment in X, Y, Z-axis directions and is fixed to one end of the cylindrical main body thus produced. An element having a spherical lens is subjected to the optical axis adjustment in the X, Y, Z-axis directions and is fixed to the another end of the cylindrical main body, and further an element having a capillary tube assembly (ferrule assembly) is subjected to the optical axis adjustment in the X, Y, Z-axis directions to be fixed. Further, there is disclosed as the above-mentioned element an element in which an aspherical lens press-fitted and fixed into the lens holder and a band pass filter are fixed to the cylindrical sleeve (FIG. 2A).

CITATION LIST

Patent Literature 1: JP 2002-182061 A
Patent Literature 2: JP 2003-344697 A
Patent Literature 3: JP 2005-10372 A
Patent Literature 4: JP 2005-24928 A
Patent Literature 5: JP 2004-271894 A
Patent Literature 6: JP 2003-121681

SUMMARY OF INVENTION

Technical Problem

In the optical device having a structure in which two capillary tube/lens assemblies are fixed to an inside of the accommodation member so that the lenses are opposed to each other through an intermediation of an optical functional component, a light axis of input/output light is misaligned in many cases with a center axis of the sleeve in each of the capillary tube/lens assemblies. For that reason, under a state in which each of the capillary tube/lens assemblies is inserted to an inside of the accommodation member to which the optical functional component is fixed in advance, it is necessary to adjust a position of each of the capillary tube/lens assemblies to obtain an optimum optical alignment state. Then, in order to achieve the position adjustment, it is necessary to secure a relatively large gap (diameter difference) between an outer periphery of each of the capillary tube/lens assemblies and an inner periphery of the accommodation member. As a result, when the outer periphery of the sleeve of each of the respective capillary tube/lens assemblies is fixed by the adhesive to the inner periphery of the accommodation member, a relatively large amount of adhesive enters the gap. Accordingly, due to shrinkage by curing or aged deterioration of the adhesive, there was a case where high reliability may not be obtained in terms of performances such as optical characteristics and weather resistance of the optical device being a finished product.

In particular, recently, in a field of optical communication, along with development of a multimedia information society, needs with respect to high-speed optical communication, wavelength division multiplexing communication (WDM), dense wavelength division multiplexing communication (DWDM), and the like, are increasing. With respect to optical devices used in those communication systems, there is an increasing demand for improving reliability under conditions in which light of higher energy is input and output. Use of the adhesive of a relatively large amount in the optical device of this type results in increasing a fear of heat deterioration of the adhesive along with a temperature rise of the optical device due to high-energy input/output light. Further, when the adhesive is in an optical path of the input/output light, depending on conditions, the adhesive may not withstand the high energy of the input/output light, and hence there may be predicted that there is a fear of causing damages such as burnout.

Further, the lens and the sleeve, and the sleeve and the accommodation member are fixed to each other, respectively, and hence if a stress caused by difference in a thermal expansion amount or a contraction amount between the respective members is concentrated into the lens, refractive index thereof partially changes, resulting in deviation of optical characteristics of the lens.

Besides, the optical device described in Patent Literature 5 has a structure in which two lenses and an optical functional component (filter) each are assembled individually, and if right and left base members (7a and 7b) and right and left capillary tube assemblies are included in calculation, total six elements are laminated and fixed to each other. Moreover, the optical fiber has such a structure that, under a state in which an end surface of the sleeve of the capillary tube assembly is joined to an end surface of a cylindrical bush of the lens assembly, a leading end surface of the optical fiber is allowed to have a PC contact with an input/output surface of the lens, and further, a distance in an axial direction between the leading end of the optical fiber and a filter (17) is determined based on sizes in an axial direction between the lens and the cylindrical bush and the base members (7a and 7b), respectively. For that reason, not only being a trouble in alignment operation, but also being a less degree of freedom in adjusting positions of the respective elements, it is necessary to process the structural components of the respective elements with high precision in order to obtain the optimum optical alignment state. As a result, a manufacturing cost thereof increases.

In addition, in the optical device described in Patent Literature 6, respective cylindrical sleeves of a plurality of elements including various optical components such as a band pass filter and an optical isolator are formed into the same outer diameter dimension, and the alignment is performed using markers on the outer diameter of the respective cylindrical sleeves to obtain the optical alignment state of the various optical components. For that reason, coaxiality between the outer periphery and the inner periphery of the respective cylindrical sleeves and axial dimensions thereof, and fixation positions of the respective optical components with respect to the respective cylindrical sleeves are necessary to be controlled with high precision, resulting in an increase in manufacturing cost.

Note that, in the optical device described in Patent Literature 1, there is provided a lens assembly in which each of the lenses are fixed into the inside of the accommodation member (protective tube) so as to oppose with each other through the intermediation of the optical functional component, and hence in order to secure excellent optical characteristics, it is necessary to adjust the respective positions of the lens assembly and the capillary tube which is fixed to the lens assembly to obtain the optimum optical alignment state. In particular, in the lens assembly, it becomes necessary to perform precise position adjustments of the two lenses with respect to the accommodation sleeve (accommodation member) to be fixed in order to realize the optimum optical alignment states from a relation with the optical fiber. For that reason, it is generally to secure a relatively large gap (diameter difference) between an inner peripheral surface of the accommodation sleeve and an outer peripheral surface of each of the lenses in order to enable optical axis adjustment of the positions of the lenses. For that result, when the outer surface of each of the lenses is fixed to the outer peripheral surface of the accommodation sleeve by the adhesive, a relatively large amount of the adhesive enters the gap, resulting in causing displacement of the fixed position of the lens, which has been subjected to position adjustment, due to shrinkage by curing or aged deterioration of the adhesive. As are result, there was a case where high reliability may not be obtained in terms of performances such as optical characteristics and weather resistance of the optical device, which being a finished product.

On the other hand, in a case where a so-called hemispherical lens, in which a part of the spherical lens has a flat surface portion, is used for the optical devices of Patent Literatures 1 to 6, it is preferred to reduce as much as possible an optical transmission loss which is generated because the light path of a main light beam passing through the hemispherical lens is not strictly precise to cause a problem of spherical aberration, resulting in inappropriate collimate light, and a reflection loss which is generated by the reflection of the light by the flat surface portion of the hemispherical lens and reverse travelling of the light in order to obtain exact optical characteristics. However, in this kind of the optical device, it is actual conditions that appropriate countermeasures are not taken, in addition to existing problems, with respect to the problems of the optical transmission loss and the reflection loss due to the hemispherical lens.

It is an object of the present invention to provide an optical device with a high reliability in performances such as optical characteristics and weather resistance.

It is another object of the present invention is to provide an optical device, in which a manufacturing cost thereof may be reduced.

Solution to Problem

In order to solve the above-mentioned problems, the present invention provides an optical device, including: a first capillary tube assembly and a second capillary tube assembly each including a capillary tube into which each of optical fibers is inserted and fixed, each of the capillary tubes being retained by each of retaining members; and a lens assembly including: a first lens and a second lens, which are opposed to a leading end of the each of the optical fibers of the first capillary tube assembly and the second capillary tube assembly through a space; an optical functional component interposed between the first lens and the second lens; and an accommodation member for accommodating those components, wherein: each of the retaining members for retaining the first capillary tube assembly and the second capillary tube assembly is fixed to a one end surface and an another end surface of the accommodation member, respectively; at least one lens of the first lens and the second lens includes a spherical lens having a center of curvature of a spherical portion inside the spherical portion and including a part of the spherical portion formed into a flat surface portion, the flat surface portion being provided under a state of opposing the leading end of the each of the optical fibers so as to be inclined with respect to an optical axis of the each of the optical fibers; and the center of curvature of the spherical portion is a straight line perpendicular to the optical axis, and is offset, in a direction along a straight line having an inclined angle which becomes a maximum with the flat surface portion, from the optical axis to a passing area side of a main light beam of input/output light with respect to the leading end of the each of the optical fibers.

The optical device according to the present invention has such a structure that the first capillary tube assembly and the second capillary tube assembly each are fixed to both end surfaces of the accommodation member of the lens assembly accommodating the first lens, the second lens, and the optical functional component. Accordingly, when adjusting the positions of the first capillary tube assembly and the second capillary tube assembly with respect to the lens assembly so as to obtain an optimum optical alignment state, movement of the capillary tube assembly to an adjustment position is not limited by the inner periphery of the accommodation member. Therefore, compared to the conventional optical device, it is not necessary to secure a large gap in the inner periphery of the accommodation member for alignment, and hence it is possible to reduce the amount of adhesive for fixing the lens and the optical functional component. Owing to this, deterioration of the optical characteristics, the weather resistance, and the like of the optical device, which are caused by the shrinkage by curing or aged deterioration of the adhesive, may be suppressed, and the optical device with high reliability may be constructed. In addition, the degree of freedom for position adjustment of the first capillary tube assembly and the second capillary tube assembly with respect to the lens assembly is relatively large, and hence without processing the respective components with high precision over necessity, it is possible to obtain the optimum optical alignment state, and further it is possible to relatively easily conduct the optical alignment operation. As a result, it is possible to reduce the manufacturing cost.

Here, the optical functional component means an optical filter (such as band pass filter, long wavelength transmission/reflection filter, short wavelength transmission/reflection filter, or gain equalizer filter for correction), an optical isolator core, or the like.

Each of the first lens and the second lens has a function of collimating light output from the optical fiber into parallel light and collecting the parallel light to allow the collected light to input into the optical fiber. Besides, as the first lens and the second lens, there may be used the above-mentioned GRIN lens, drum lens, C lens or aspherical lens. However, one of or both of the first lens and the second lens is/are a spherical lens having a center of curvature of the spherical surface portion inside the spherical portion and including a part of the spherical portion formed into a flat surface portion. Specifically, the spherical lens is formed of the spherical portion and the flat surface portion, and has the center of the curvature of the spherical portion inside the spherical portion (hereinafter, simply referred to as "hemispherical lens"). Preferably, the hemispherical lens is a lens produced by processing a part of the spherical lens into a flat surface portion. If such structure is taken, the lens includes the above-mentioned flat surface portion and the spherical surface portion (partial spherical surface) in which apart of the spherical surface of the spherical lens is remained as it is. Further, the hemispherical lens has the center of curvature of the spherical surface portion inside the spherical portion, and hence a length of line segment (L) extending from an apex of the spherical surface of the spherical surface portion to the flat surface portion through the center of curvature becomes larger than a curvature radius (R: radius of spherical lens) of the spherical surface portion. With taking such a structure, an apex portion is not formed any more at a boundary between the spherical surface portion and the flat surface portion, resulting in hardly occurring damages such as chipping in the hemispherical lens. Further, the hemispherical lens may be handled more easily by using a gripping tool such as tweezers. Note that, the flat surface portion constitutes a surface perpendicular to the above-mentioned line.

The hemispherical lens has such an advantage that, compared to the GRIN lens or the like, only by changing a shape or a material (kind or composition of material) of the lens, such as the curvature radius (R: radius of spherical lens) of the spherical portion, or the length (L) of the line, optical characteristics of the hemispherical lens may easily be changed. Further, the spherical lens serving as the material may be manufactured with high precision, and hence the hemispherical lens obtained by processing the spherical lens may be manufactured with high precision, and moreover at relatively low costs.

In the present invention, the above-mentioned hemispherical lens is arranged such that the flat surface portion thereof is inclined with respect to an optical axis of the optical fiber having a leading end opposing to the flat surface portion, and hence the flat surface portion of the hemispherical lens is irradiated with light from the optical fiber while being inclined. For that reason, reflection light reflected by the flat surface portion of the hemispherical lens does not form the return light, which travels reversely to the optical fiber, whereby the reflection loss of the light transmission may be reduced as much as possible. Note that, the above-mentioned flat surface portion of the hemispherical lens is inclined by an angle of from 2° to 7° with respect to a surface having a right angle to the optical axis of the optical fiber depending on the refractive index of the hemispherical lens or the inclined angle of the leading end surface of the optical fiber. Moreover, in the above-mentioned hemispherical lens, the center of curvature of the spherical portion is offset from the optical axis of the optical fiber (deflect) in a direction along a straight line which is perpendicular to the optical axis of the optical fiber and has a maximum inclined angle with the flat surface portion, and is also offset to a passing area side of the main light beam of the input/output light with respect to the leading end of the optical fiber, namely, on a side to which the light output from the leading end of the optical fiber is deflected at the leading end. Accordingly, as the main light beam of the light passing through the hemispherical lens approaches to the center of curvature thereof as close as possible, the problem of spherical aberration may be prevented, resulting in obtaining proper collimate light, and reducing the optical transmission loss as much as possible. Note that, "the optical axis of the optical fiber" described herein means, in a case where a single optical fiber is inserted and fixed to a single capillary tube, a single optical axis of the optical fiber, and means, in a case where two or more of the optical fibers are inserted and fixed to the single capillary tube, a center axis in a region in which the two or more of the optical axes of the optical fibers are arrayed.

In this case, it is preferred that the optical fiber including the leading end which is opposed to the inclined flat surface portion of the spherical lens and a leading end of the capillary tube into which the optical fiber is inserted and fixed, be inclined along an inclination of the flat surface portion of spherical lens. In this case, "be inclined along" refers to a case in which the inclined direction may be the same or substantially same, and there is not required strict identicalness of the inclined angle. With taking such a structure, the reflection light reflected by the leading end surface of the optical fiber may be escaped outside the optical, and noise reduction is achieved, resulting in becoming available of long distance transmission.

Further, there are cases in which a number of the optical fiber to be inserted and fixed into a single capillary tube is one or multiple. Therefore, in a case where the optical fiber to be inserted into and fixed to at least one capillary tube of the first capillary tube assembly and the second capillary tube assembly is one, the lens, which is formed of the spherical lens including the flat surface portion which is opposed to the leading end through a space to be inclined, may be constructed so that the main light beam of the input/output light with respect to the optical fiber passes through the center of curvature of the spherical portion of the lens. On the other hand, in a case where the optical fiber to be inserted into and fixed to at least one capillary tube of the first capillary tube assembly and the second capillary tube assembly is more than one, the lens, which is formed of the spherical lens including the flat surface portion which is opposed to the leading end through a space to be inclined, may be constructed so that a plurality of main light beams of the input/output light with respect to the optical fiber pass through the surroundings of the center of curvature of the spherical portion of the lens as a reference adjacently at the same angle intervals. In this case, in a case where the above-mentioned optical fiber is two, two main light beams are allowed to pass through symmetric positions adjacently on both sides of the center of curvature (both sides of direction in which inclined angle of inclined flat surface portion becomes zero). Accordingly, in even any case, the increase in spherical aberration and the insertion loss due to the same may be reduced as much as possible.

Further, the above-mentioned hemispherical lens may be fixed directly to the accommodation member of the lens assembly, but preferably be fixed to the lens holder having the through hole. Specifically, under a state in which the spherical portion of the hemispherical lens is abutted on a one end side edge portion of the through hole of the lens holder, the hemispherical lens is fixed to the lens holder by an adhesive, or the like. Through the abutment of the spherical portion of the hemispherical lens on the one end side edge portion of the through hole of the lens holder, the center of curvature of the spherical portion of the hemispherical lens and the center of the through hole of the lens holder may easily be coincided with each other. Note that, the size and shape of the through hole of the lens holder hole may appropriately be determined within a range of being capable of obtaining such an aligning action. For example, as the shape of the through hole, there may employ a circle shape, or a regular polygon (equilateral triangle, quadrate, equilateral hexagon, etc.).

Further, through control of a coaxiality between the outer periphery of the lens holder and the through hole, and a perpendicularity between the end surface and the outer periphery, and through the fixture of thus controlled lens holder to the accommodation member by an adhesive, or the like, is possible to make coincide or make substantially coincide the center of curvature of the hemispherical lens fixed to the lens holder with the center axis of an inner periphery of the accommodation member. With this, the subsequent optical alignment operation for the capillary tube assembly may be facilitated more. Further, in this case, the hemispherical lens is fixed to one end side of the lens holder, and is not directly fixed to the accommodation member. As a result, among the hemispherical lens, the lens holder, and the accommodation member, even if the differences in thermal expansion amounts or contractions occur, such a stress that causes a deviation in the optical characteristics does not act on the hemispherical lens.

In addition, the optical functional component may be configured to be fixed to another end side of the above-mentioned lens holder. For example, through an employment of such an assembling method that an assemble body, in which the hemispherical lens is fixed to one end side of the lens holder, and the optical functional component is fixed to another end side, is produced in advance, and the assemble body is accommodated in the accommodation member, and after positional alignment, the lens holder is fixed to the accommodation member, a simplification of assembling work may be achieved. Further, as the through hole of the lens holder hole serves as a light path, even in a case where the optical functional component is fixed to the lens holder by the adhesive, the adhesive does not enter the light path. In addition, distances between the hemispherical lens and the optical functional component may easily be set with precision by controlling a thickness in an optical axis direction of the lens holder.

On the other hand, it is preferred that a center axis of at least one of the two retaining members is decentered with respect to a center axis of an inner periphery of the accommodation member in correspondence with the offset of the center of curvature of the lens. With taking such a structure, under a state in which the hemispherical lens is accommodated within the accommodation member without causing the center of curvature to be offset, by only fixing the retaining members at both ends in an axial direction to the accommodation member so as to be decentered, the center of curvature of the hemispherical lens may be offset with respect to the optical axis of the optical fiber. As a result, the assembling work for assembling the hemispherical lens with the center of curvature being offset may be facilitated.

Further, the present invention provides, in order to solve the above-mentioned problems, a lens assembly including: a lens including a spherical lens having a center of curvature of a spherical portion inside the spherical portion and including a part of the spherical portion formed into a flat surface portion; a lens holder having a through hole; and an accommodation member for accommodating those components, and having a structure in which the flat surface portion of the lens is inclined with respect to the center axis of the inner periphery of the accommodation member, and the lens is fixed to the lens holder under a state in which the spherical portion of the lens is abutted on a one end side edge portion of the through hole of the lens holder. With taking such a structure, in addition to such advantages that high reliability in terms of performances such as optical characteristics and weather resistance may be obtained, and its manufacturing cost may be reduced, from the same reason described above, the reflection loss may be reduced.

In this case, there may be employed a structure in which an optical functional component is accommodated within the accommodation member in adjacent to another end side of the lens holder. In this case, the optical functional component may be fixed to another end side of the lens holder. In addition, the lens holder may be fixed to the accommodation member.

In addition, there may be employed a structure in which a second lens holder having a through hole and a second lens formed by processing a part of the spherical lens into the flat surface portion are accommodated in the accommodation member in adjacent to the optical functional component in the stated order; and the second lens is fixed to the second lens holder under a state in which the spherical surface portion of the lens abuts on an edge portion of another end side of the through hole of the lens holder. In this case, the second lens holder may be fixed to the accommodation member. Further, it is preferred that the second lens be inclined so that the flat surface portion thereof is symmetric with the flat surface portion of the first lens.

Further, in order to solve the above-mentioned problems, the present invention provides, as a first lens assembly, a lens assembly including a first lens and a second lens each including a spherical lens having a center of curvature of a spherical portion inside the spherical portion and including a part of the spherical portion formed into a flat surface portion; a lens holder having a through hole; an optical functional component; and an accommodation member for accommodating those components, and having a structure in which the flat surface portion of the first lens is inclined with respect to a center axis of an inner periphery of the accommodation member, and the lens is fixed to the accommodation member under a state in which the spherical portion of the lens is abutted on an edge portion of an opening on one end side of the accommodation member, and the flat surface portion of the second lens is inclined so as to be symmetric to each other with the flat surface portion of the first lens, and is fixed to the accommodation member under a state in which the spherical portion of the second lens is abutted on an another end side opening edge portion of the accommodation member. Note that, the optical functional component used herein also means an optical filter (such as band pass filter, long wavelength transmission/reflection filter, short wavelength transmission/reflection filter, or gain equalizer filter for correction), an optical isolator core, or the like (hereinafter, the same as above).

According to the structure described above, the center of curvature of the spherical portion of each of the hemispherical lenses constituting the first lens and the second lens may easily be made coincide with the center axis of the inner periphery of the accommodation member. Specifically, the flat surface portion of each of the hemispherical lenses is inclined with respect to the center axis of the inner periphery of the accommodation member. However, by only abutting the spherical portion of each of the hemispherical lenses on the opening edge portion of the accommodation member, the center of curvature of the spherical portion may be aligned with precision on the center axis of the inner periphery of the accommodation member. Further, compared to a case in which a large gap is secured between the inner peripheral surface of the accommodation member and the outer peripheral surface of the lens to conduct the alignment, the amount of the adhesive necessary for fixing the lens may be largely reduced. Accordingly, if such lens assembly is incorporated into the optical device, while suppressing the deterioration of the optical characteristics, the weather resistance, and the like of the optical device due to the shrinkage by curing or aged deterioration of the adhesive, an optimum optical alignment state may be secured. As a result, the optical device with high reliability may be constructed. Specifically, in a case where such lens assembly is incorporated into the optical device such as an optical multiplexer/demultiplexer, an optical isolator, an optical isolator, an optical switch, or an optical gain equalizer, high reliability in terms of performances such as optical characteristics and weather resistance may be obtained.

Further, each of the lenses may be aligned to the optimum position by abutting each of the spherical portion on the opening edge portion of the accommodation member, no cumbersome and complicated work is required for the optical alignment operation of the lens. Accordingly, if such lens assembly is incorporated into the optical device, in addition to the above-mentioned high reliability on the performances, the reduction of the manufacturing cost may be achieved at the same time. In addition, the flat surface portion of each of the lenses is inclined with respect to the center axis of the inner periphery of the accommodation member so as to be symmetric with each other, the reduction of the reflection loss may be exactly achieved.

Note that, in this case, the first lens and the second lens are fixed to edge portions of the openings of the both ends of the common accommodation member, and hence by controlling a dimension of the accommodation member in an axial direction, an interval between the first lens and the second lens may easily be set with precision.

In the above-mentioned structures, it is preferred that an inner sleeve be fitted to an inner periphery of the accommodation member; the inner sleeve be fixed, under a state in which an edge portion of an opening on one end side of the inner sleeve is abutted on the spherical portion of any one of the first lens or the second lens, to at least one of the spherical portion and an inner peripheral surface of the accommodation member; and the optical functional component be fixed to another end surface of the inner sleeve.

According to the structure described above, by only controlling the dimensions of the accommodation member, the inner sleeve, and the optical functional component (dimensions in axis direction of accommodation member), the respective distances among the first lens, the second lens, and the optical functional component may easily be set with precision. Note that, the inner space of the inner sleeve serves as the light path of light, even in a case where the optical functional component is fixed to the inner end surface of the sleeve by the adhesive, the entering of the adhesive into the light path may be suppressed as much as possible.

In addition, in order to solve the above-mentioned problems, the present invention provides, as a second lens assembly, a lens assembly including: a first lens and a second lens each including a spherical lens having a center of curvature of a spherical portion inside the spherical portion and including a part of the spherical portion formed into a flat surface portion; a first inner sleeve, a second inner sleeve, an optical functional component, and an accommodation member for accommodating at least the first inner sleeve, the second inner sleeve, and the optical functional component among those components, and having a structure in which: the first inner sleeve and the second inner sleeve are each coaxially fit-fixed to inner peripheries of the accommodation member under a state in which the optical functional component is interposed in a space between respective one end surfaces which are opposed to each other; the flat surface portion of the first lens is inclined with respect to a center axis of an inner periphery of the accommodation member, and the lens is fixed to the first inner sleeve under a state in which the spherical portion of the lens is abutted on an edge portion of an opening on one end side of the first inner sleeve; and the flat surface portion of the second lens is inclined so as to be symmetric to each other with the flat surface portion of the first lens, and is fixed to the second inner sleeve under a state in which the spherical portion of the second lens is abutted on an another end side opening edge portion of the second inner sleeve.

According to the structure described above, the center of curvature of the spherical portion of the first lens may easily be made coincide with the center axis of the inner periphery of the first inner sleeve, and also the center of curvature of the spherical portion of the second lens may easily be made coincide with the center axis of the inner periphery of the second inner sleeve. Then, the first inner sleeve and the second inner sleeve are fit and fixed coaxially, respectively, to the inner periphery of the common accommodation member, and hence the center of curvature of the each of the spherical portions of the first lens and the second lens is made coincide with the center axis of the inner periphery of the accommodation member. Specifically, by abutting the spherical portion of each of the lenses with the corresponding opening edge portion of the inner sleeve, the center of curvature of the spherical portion may be aligned with precision on the center axis of the inner periphery of the accommodation member. Further, compared to a case where the alignment is conducted while securing a large gap between the inner peripheral surface of the accommodation member and the outer peripheral surface of the lens, the amount of adhesive necessary for fixing the lens may largely be reduced. Accordingly, if such lens assembly is incorporated into the optical device, while suppressing the deterioration of the optical characteristics, the weather resistance, and the like of the optical device due to the shrinkage by curing or aged deterioration of the adhesive, an optimum optical alignment state may be secured. As a result, the optical device with high reliability may be constructed. Specifically, in a case where such lens assembly is incorporated into the optical device such as an optical multiplexer/demultiplexer, an optical isolator, an optical isolator, an optical switch, or an optical gain equalizer, high reliability in terms of performances such as optical characteristics and weather resistance may be obtained. Note that, each of the sleeves are fit and fixed to the inner peripheral surface of the accommodation member, and hence it is unnecessary to form a large gap between the inner peripheral surface of the sleeve and the accommodation member, with the result that, even in a case of fixing those members to each other, the amount of the adhesive may be reduced.

Further, each of the lenses may be aligned to the optimum position by abutting each of the spherical portion on the opening edge portion of each of the inner sleeves, though each of the flat portions is inclined, no cumbersome and complicated work is required for the optical alignment operation of the lens. Accordingly, if such lens assembly is incorporated into the optical device, in addition to the above-mentioned high reliability on the performances, the reduction of the manufacturing cost may be achieved at the same time. In addition, the reduction of the reflection loss may be achieved.

In the above-mentioned structures, it is preferred that the first inner sleeve, the second inner sleeve, and the optical functional component be communicated within the accommodation member.

According to the structure described above, by controlling the respective dimensions of the first inner sleeve, the second inner sleeve, and the optical functional component (dimensions in axis direction of accommodation member), the respective distances among the first lens, the second lens, and the optical functional component may easily be set with precision. Note that, the inner space of the inner sleeve serves as the light path of light, even in a case where the optical functional component is fixed to the inner end surface of the sleeve by the adhesive, the entering of the adhesive into the light path may be suppressed as much as possible.

In the above-mentioned structures, it is preferred that the first lens and the second lens each be produced by processing a part of the spherical lens into the flat surface portion.

With employing such a structure, the spherical portion of the first lens and the spherical portion of the second lens may relatively, easily be processed with precision, thereby being capable of positively obtaining an optimum optical alignment state of each of the lenses.

Further, in order to solve the above-mentioned problems, the present invention provides, as a characteristic optical device, an optical device including the first lens assembly as described above, and having a structure in which: in the lens assembly, retaining members each retaining a capillary tube into which an optical fiber is inserted and fixed is fixed to the one end surface and the another end surface of the accommodating member; and a center of curvature of a spherical portion of each of the first lens and the second lens is a straight line which is perpendicular to an optical axis of each of the optical fibers, and is offset, in a direction along a straight line having an inclined angle which becomes a maximum with the flat surface portion, from the optical axis to a passing area side of a main light beam of input/output light with respect to the leading end of the each of the optical fibers.

According to the structure described above, in addition to being capable of similarly enjoying the operation effect of the first lens assembly described above, the increase in spherical aberration due to large deviation of the main light beams passing through the respective hemispherical lenses in order to input/output to the respective optical fibers from the center of curvature of the spherical portion and an insertion loss due to the same may appropriately be reduced.

Note that, the optical device may take such a structure that the retaining members retaining the capillary tubes, into which the optical fiber is inserted and fixed, are fixed to the respective flat surface portions of the first lens and the second lens in the above-mentioned first lens assembly.

In addition, in order to solve the above-mentioned problems, the present invention provides, as a characteristic optical device, an optical device including the second lens assembly as described above, and having a structure in which: in the lens assembly, retaining members each retaining a capillary tube into which an optical fiber is inserted and fixed is fixed to each of an end surface on a side, to which a first lens of a first inner sleeve is fixed and an end surface on a side, to which a second lens of a second inner sleeve is fixed; and a center of curvature of a spherical portion of each of the first lens and the second lens is a straight line which is perpendicular to an optical axis of each of the optical fibers, and is offset, in a direction along a straight line having an inclined angle which becomes a maximum with the flat surface portion, from the optical axis to a passing area side of a main light beam of input/output light with respect to the leading end of the each of the optical fibers.

According to the structure described above, in addition to being capable of similarly enjoying the operation effect of the second lens assembly described above, the increase in spherical aberration due to large deviation of the above-mentioned hemispherical lens from the center of curvature and an insertion loss due to the same may be reduced.

Further, in order to solve the above-mentioned problems, the present invention provides, as a characteristic optical device, an optical device including the second lens assembly as described above, and having a structure in which: in the lens assembly, retaining members each retaining a capillary tube into which an optical fiber is inserted and fixed is fixed to each of the flat surface portions of the first lens and the second lens; and a center of curvature of a spherical portion of each of the first lens and the second lens is a straight line which is perpendicular to an optical axis of each of the optical fibers, and is offset, in a direction along a straight line having an inclined angle which becomes a maximum with the flat surface portion, from the optical axis to a passing area side of a main light beam of input/output light with respect to the leading end of the each of the optical fibers.

According to the structure described above, in addition to being capable of similarly enjoying the operation effect of the second lens assembly described above, the increase in spherical aberration due to large deviation of the above-mentioned hemispherical lens from the center of curvature and an insertion loss due to the same may be reduced.

In the above-mentioned characteristic optical device, it is preferred that the optical fiber including the leading end which is opposed to the inclined flat surface portion of a hemispherical lens and a leading end of the capillary tube into which the optical fiber is inserted and fixed, be inclined along an inclination of the flat surface portion of spherical lens.

According to the structure described above, as in the above-mentioned cases, the reflection light reflected by the leading end surface of the optical fiber may be escaped outside the optical, and noise reduction is achieved, resulting in becoming available of long distance transmission.

Further, in the above-mentioned characteristic optical device, there are a case where one optical fiber is inserted and fixed into a single capillary tube, and a case where a plurality of optical fibers are inserted and fixed. Therefore, in a case where the optical fiber to be inserted into and fixed to at least one capillary tube of the two capillary tubes is one, the lens, which is formed of the spherical lens including the flat surface portion which is opposed to the leading end of the optical fiber, is constructed so that the main light beam of the input/output light with respect to the optical fiber passes through the center of curvature of the spherical portion of the lens. On the other hand, in a case where the optical fiber to be inserted into and fixed to at least one capillary tube of the two capillary tubes is more than one, the lens, which is formed of the spherical lens including the flat surface portion which is opposed to the leading end through a space to be inclined, is constructed so that a plurality of main light beams of the input/output light with respect to the optical fiber pass through the surroundings of the center of curvature of the spherical portion of the lens as a reference adjacently at the same angle intervals.

In addition, in the above-mentioned characteristic optical device, it is preferred that a center axis of at least one of the two retaining members be decentered with respect to a center axis of the accommodation member in correspondence with the offset of the center of curvature of the lens. With taking such a structure, as in the cases described above, operation for incorporating the hemispherical lens into the optical device so that the center of curvature thereof is in an offset state may be facilitated.

Further, in the above-mentioned characteristic optical device, because of the same reason as in the cases described above, it is preferred that the first lens and the second lens each be produced by processing a part of the spherical lens into the flat surface portion.

Advantageous Effects of Invention

According to the present invention, the optical device with high reliability in terms of performances such as optical characteristics and weather resistance may be provided. Further, according to the present invention, the optical device, which is less expensive, may be provided by reducing the manufacturing cost. In addition, according to the present invention, it is possible to reduce the reflection loss due to the flat surface portion of the hemispherical lens, or the light transmission loss due to the center of curvature as much as possible.

BRIEF DESCRIPTION OF DRAWINGS

FIG. 9b A vertical sectional side view illustrating a schematic structure of the optical device according to the eighth embodiment of the present invention.

Figure 1A:
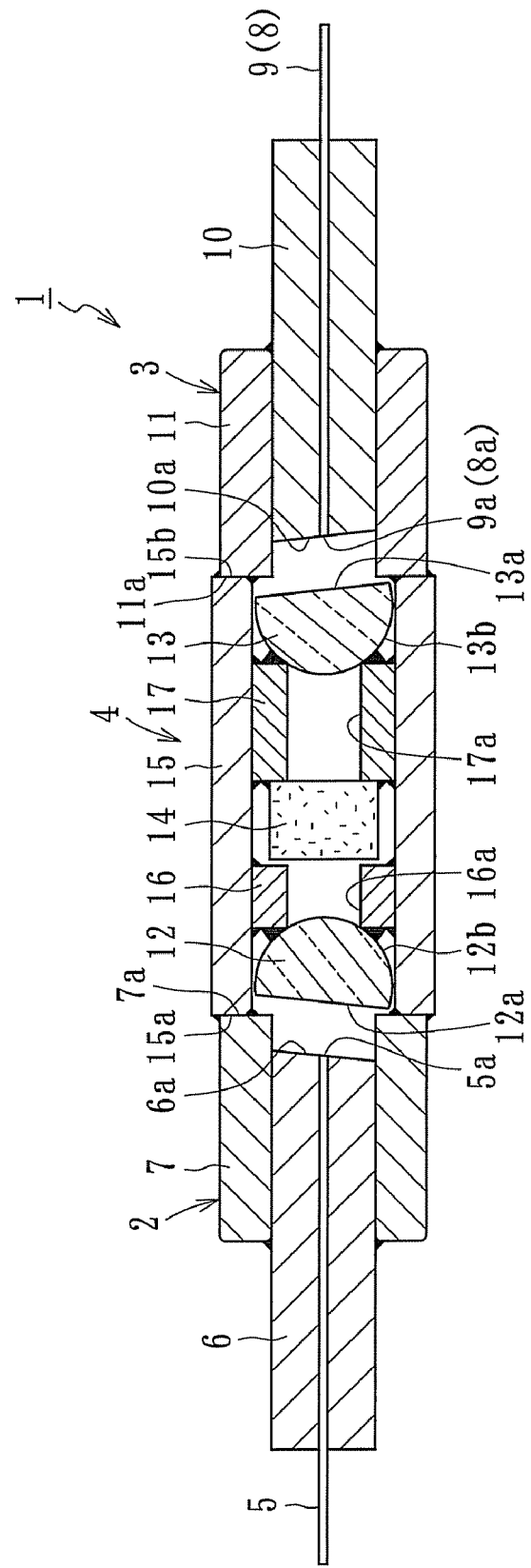
FIG. 1a A cross sectional plan view illustrating a schematic structure of an optical device according to a first embodiment of the present invention.

REFERENCE SIGNS LIST 1, 21, 31, 51, 61, 71, 81, 91 optical device
2, 32 first capillary tube assembly
3, 33 second capillary tube assembly
4, 34 lens assembly
5, 8, 9, 35, 38, 39 optical fiber
6, 10, 10', 36, 40, 40' capillary tube
5a, 8a, 9a, 35a, 38a, 39a leading end surface of optical fiber
5x optical axis of optical fiber
6a, 10a, 10a', 36a, 40a, 40a' leading end surface of capillary tube
7, 11, 37, 41 retaining sleeve (retaining member)
7a, 11a, 37a, 41a end surface of retaining sleeve
12, 42 first lens
12a, 42a flat surface portion of first lens
12b, 42b spherical portion of first lens
13, 43 second lens
13a, 43a flat surface portion of second lens
13b, 43b the spherical portion of second lens
14, 44 band pass filter (optical functional component)
14', 44' isolator core (optical functional component)
15, 45 accommodation sleeve (accommodation member)
15a, 45a one end surface of accommodation member
15b, 45b another end surface of accommodation sleeve first lens holder
16a through hole of first lens holder
16a second lens holder
17a through hole of second lens holder
46 inner sleeve
46a one end surface of inner sleeve
46b another end surface of inner sleeve
63 second inner sleeve
63a one end surface of second inner sleeve
63b another end surface of second inner sleeve
64 first inner sleeve 64a one end surface of first inner sleeve
64b another end surface of first inner sleeve
A center of curvature
B1 main light beam
Δa offset amount
α inclined angle
L straight line

DESCRIPTION OF EMBODIMENTS

Now, embodiments of the present invention are described with reference to the drawings.

Figure 1B:
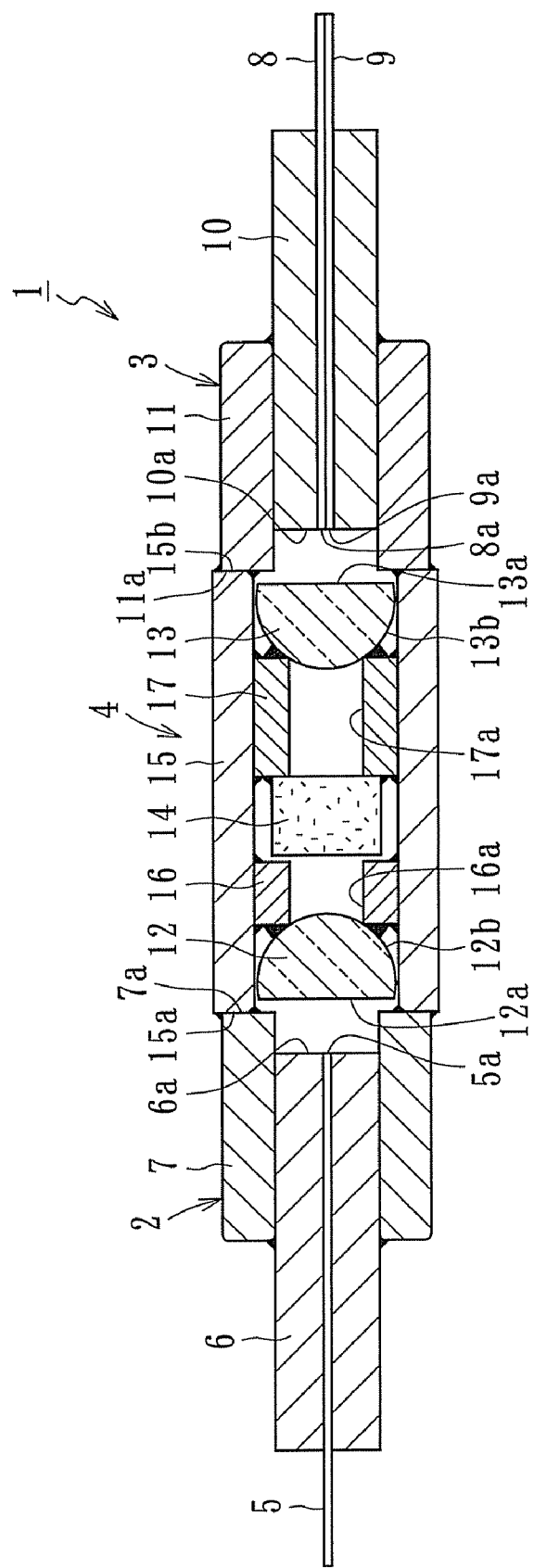
FIG. 1b A vertical sectional side view illustrating a schematic structure of the optical device according to the first embodiment of the present invention.

FIG. 1a and FIG. 1b illustrate schematic structures of an optical device 1 according to a first embodiment of the present invention. Specifically, FIG. 1a is a cross sectional plan view, and FIG. 1b is a vertical sectional side view. Both figures each illustrate the optical device 1, which is taken along two orthogonal surfaces including a center axis. The optical device 1 has a structure in which a single-core collimator and a double-core collimator are combined together. The optical device 1 may be used for wavelength division multiplex (WDM) or the like.

The optical device 1 includes as main components a first capillary tube assembly 2, a second capillary tube assembly 3, and a lens assembly 4.

The first capillary tube assembly 2 includes a capillary tube 6 made of glass, in which one optical fiber 5 is fixed by the adhesive in an inner hole of a single core, and a retaining sleeve 7 made of glass, which is coaxially fitted onto an outer periphery of the capillary tube 6 and fixed thereto by the adhesive. A leading end surface 5a of the optical fiber 5 and a leading end surface 6a of the capillary tube 6 are subjected to polishing to form the same inclined surface inclined, in the vertical sectional side surface illustrated in FIG. 1a, with respect to the optical axis of the optical fiber 5. As a result, return light reflected by the leading end of the optical fiber 5 is suppressed. Further, on the leading end surface 5a of the optical fiber 5, there is formed an antireflection film. A one end surface 7a of the retaining sleeve 7 is formed into a surface which forms a right angle with the optical axis of the optical fiber 5. A perpendicularity of the end surface 7a is controlled with a precision of, for example, ±0.5 degrees or less, preferably, ±0.1 or less degrees with respect to a geometrically ideal flat surface in which the optical axis of the optical fiber 5 serves as the normal line.

The second capillary tube assembly 3 includes a capillary tube 7 made of glass, in which two optical fibers 8 and 9 are fixed by the adhesive to inner holes of two cores, respectively, and a retaining sleeve 11 made of glass, coaxially fitted onto an outer periphery of a capillary tube 10 and fixed thereto by an adhesive, or the like. Leading end surfaces 8a and 9a of the optical fibers 8 and 9 and an leading end surface 10a of the capillary tube 10 are subjected to polishing so as to be symmetric with the leading end surface 5a of the optical fiber 5 and the leading end surface 6a of the capillary tube 6 described above and to form the same inclined surface inclined with respect to the optical axes of the optical fibers 8 and 9. As a result, return light reflected by ends of the optical fibers 8 and 9 are suppressed. Further, on each of the leading end surfaces 8a and 9a of the optical fibers 8 and 9, there is formed an antireflection film. A one end surface 11a of the retaining sleeve 1 is formed to be a surface perpendicular to the optical axes of the optical fibers 8 and 9. The perpendicularity of the end surface 11a is controlled with a precision of, for example, ±0.5 degrees or less, preferably, ±0.1 degrees or less with respect to a geometrically ideal flat surface in which the optical axes of the optical fibers 8 and 9 serve as normal lines.

The lens assembly 4 includes, as main components thereof, a first lens 12 which is opposed to the leading end surface 5a of the optical fiber 5 of the first capillary tube assembly 2 through a space, a second lens 13 which is opposed to the leading end surfaces 8a and 9a of the optical fibers 8 and 9 of the second capillary tube assembly 3 through a space, an optical functional component interposed between the first lens 12 and the second lens 13, for example, an optical filter, particularly, a band pass filter 14, and an accommodation sleeve (accommodating member) 15 made of glass, for accommodating those components.

Specifically, in this embodiment, the first lens 12 is a hemispherical lens in which a part of the spherical lens is processed into the flat surface portion, and includes a flat surface portion 12a formed by cutting the part of the spherical lens by polishing and a spherical portion 12b which being a residual portion of the spherical lens. Then, the first lens 12 has a center of curvature of the spherical portion 12b inside thereof, and hence the length of the line segment extending from the spherical portion 12b to the flat surface portion 12a with a right angle through the center of curvature is larger than the curvature radius of the spherical portion 12b. Note that, the length of the above-mentioned line segment in the first lens 12 is larger by 1 time and smaller by 1.5 times than the curvature radius, and is set to 1.2 times in this embodiment. Further, the second lens 13 is also a hemispherical lens, in which a part of the spherical lens is processed into a flat surface portion, and includes a flat surface portion 13a formed by cutting the part of the spherical lens by polishing and a spherical portion 13b which being a residual portion of the spherical lens. The relationship between the length corresponding to the above-mentioned line segment and the curvature radius is the same as that of the first lens 12.

In addition, the flat surface portion 12a of the first lens 12 is inclined along the inclinations of the leading end surface 5a of the above-mentioned optical fiber 5 and the leading end surface 6a of the capillary tube 6 (with directivity of the same inclination) with respect to the optical axis of the optical fiber 5, and the flat surface portion 13a of the second lens 13 is inclined along the inclinations of leading end surfaces 8a and 9a of the above-mentioned optical fibers 8 and 9 and a leading end surface 10a of the capillary tube 10 with respect to the optical axes of the optical fibers 8 and 9. Accordingly, the flat surface portions 12a and 13a of the both lenses 12 and 13 are inclined so as to be symmetric.

Figure 2:
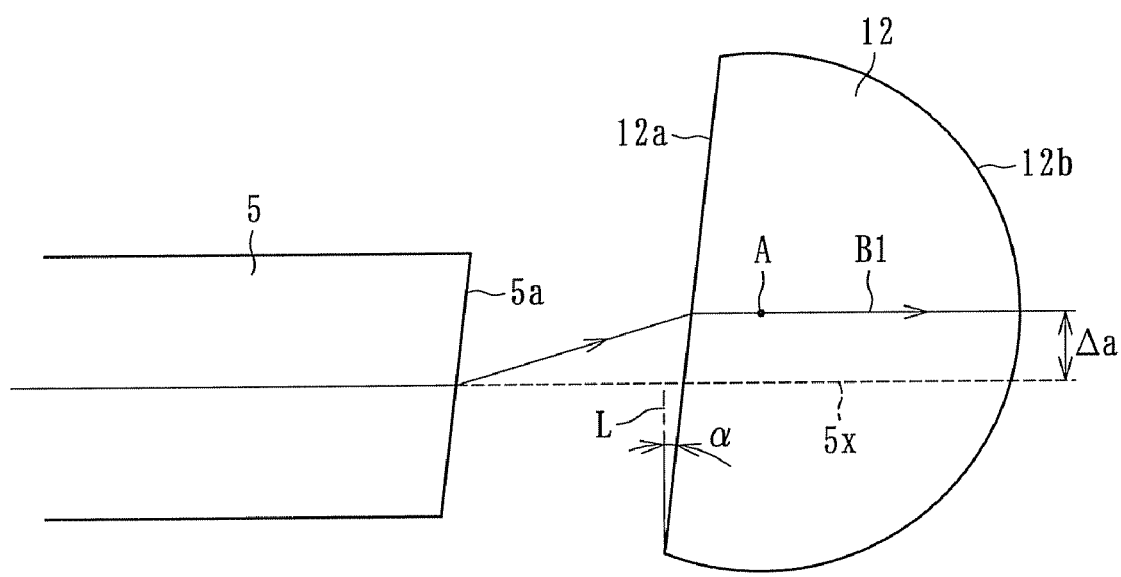
FIG. 2 An exaggerated schematic view illustrating a main portion of the optical device according to the first embodiment of the present invention.

Specifically, as illustrated in FIG. 2 in exaggeration, a center of curvature A of the spherical portion 12b of the first lens 12 is offset, in a direction along a line L, which forms a right angle with an optical axis 5x of the optical fiber (core) 5, and which makes an inclined angle α with respect to the flat surface portion 12a maximum, from the optical axis 5x of the optical fiber 5, and is also offset to a passing area side of a main light beam B1 of the input/output light to the leading end surface 5a of the optical fiber 5 by a predetermined dimension of Δa. In other words, the center of curvature A exists at a position deflected by an offset amount of Δa from the optical axis 5x of the optical fiber 5 in a direction to which the main light beam B1 of the light output from the optical axis 5x of the optical fiber 5 is deflected at the leading end surface 5a of the optical fiber 5. In this embodiment, the above-mentioned main light beam B1 is configured to pass through the center of curvature A of the first lens 12. With this structure, the problem of spherical aberration of the first lens 12 (increase in insertion loss due to increase of spherical aberration) is avoidable, and proper collimate light may be obtained, whereby the optical transmission loss may be reduced as much as possible. Further, the flat surface portion 12a of the first lens 12 is inclined with respect to a surface perpendicular to the optical axis 5x of the optical fiber 5 by an angle α (for example, when, as hemispherical lens, MK-18 manufactured by Nippon Electric Glass Co., Ltd. (described later) is used, and as optical fiber, a generally used single mode fiber (inclined angle at leading end surface is) 8°) is used at 1550 nm; about)4.7°), the light from the optical fiber 5 is irradiated onto the flat surface portion 12a with inclination. With this, the reflection light reflected by the flat surface portion 12a does not become a return light, which travels reversely to the optical fiber 5, and hence the reflection loss may be reduced as much as possible. Note that, the second lens 13 also has the same structure, and is arranged so as to be symmetric to a state illustrated in FIG. 2. However, two main light beams irradiated from two optical fibers 8 and 9 to the second lens 13 are allowed to pass through symmetric positions adjacently on both sides of the center of curvature of the second lens 13 (both sides of array direction of two optical fibers 8 and 9).

Each of the first lens 12 and the second lens 13 is formed of, for example, optical glass of a uniform refractive index type. Examples of the optical glass may include MK-18 (manufactured by Nippon Electric Glass Co., Ltd.) having a refractive index of 1.7 or more and RH-21 (manufactured by Nippon Electric Glass Co., Ltd.) having a refractive index of 1.9 or more. Note that, for example, each of the first lens 12 and the second lens 13, which is formed of MK-18 and has a relationship of L1(L2)=1.2×R1(R2), enables increase in space amount with respect to the leading end of the optical fiber about 3.7 times larger than that of a drum lens having the same refractive index and the same focal length. Accordingly, reflected return light to the optical fiber may be reduced to about one tenth or lower of the original value. Further, there is formed the antireflection film on a portion of each of the flat surface portions 12a and 13a and the spherical surface portions 12b and 13b of the first lens 12 and the second lens 13, respectively, through which light passes.

As illustrated in FIGS. 1a and 1b, the first lens 12 is fixed to an accommodation sleeve 15 through the intermediation of a first lens holder 16. The first lens holder 16 is made of glass, metal, ceramic, or the like (by glass in this embodiment) into a circular ring shape, or a cylindrical shape, and has a circular through hole 16a at a center portion thereof. The first lens 12 is fixed to one end side of the first lens holder 16 by the adhesive, while the spherical portion 12b abuts on the edge portion of the one end side of the through hole 16a of the first lens holder 16. Through the abutment of the spherical portion 12b of the first lens 12 on the edge portion of the one end side of the through hole 16a of the first lens holder 16, the center curvature A of the spherical portion 12b may easily be aligned with the center of the through hole 16a of the first lens holder 16. The first lens holder 16 is controlled in its coaxiality between the outer periphery thereof and the center of the through hole 16a, and its perpendicularity between the end surface and the outer periphery are controlled, and is fixed by the outer periphery thereof to the inner periphery of the accommodation sleeve 15. By the fixation of the first lens 12 to the thus controlled first lens holder 16, under a state in which the first lens holder 16 is fixed to the inner periphery of the accommodation sleeve 15, the center curvature A of the spherical portion 12b of the first lens 12 may be aligned or may be substantially aligned with the center axis of the inner periphery of the accommodation sleeve 15. Further, the first lens 12 is fixed to the one end side of the first lens holder 16, but is not directly fixed to the inner periphery of the accommodation sleeve 15, and hence even if the difference causes in thermal expansion amount or the contraction amount between the accommodation sleeve 15 and the first lens holder 16, such a stress causing the deviations in optical characteristics does not act on the first lens 12.

The second lens 13 is fixed to the inner periphery of the accommodation sleeve 15 through the intermediation of a second lens holder 17. The second lens holder 17 is made of glass, metal, ceramic, or the like (by glass in this embodiment), into a circular ring shape or a cylindrical shape, and has a circular through hole 17a at a center portion thereof. The second lens 13 is fixed to another end side of the second lens holder 17 by the adhesive, while the spherical portion 13b abuts on the edge portion of the another end side of the through hole 17a of the second lens holder 17. Through the abutment of the spherical portion 13b of the second lens 13 on the edge portion of the another end side of the through hole 17a of the second lens holder 17, the center curvature of the spherical portion 13b may easily be aligned with the center of the through hole 17a of the second lens holder 17. The second lens holder 17 is controlled in its coaxiality between the outer periphery thereof and the center of the through hole 17a, and its perpendicularity between the end surface and the outer periphery are controlled, and is fixed by the outer periphery thereof to the inner periphery of the accommodation sleeve 15. By the fixation of the second lens 13 to the thus controlled second lens holder 17, under a state in which the second lens holder 17 is fixed to the inner periphery of the accommodation sleeve 15, the center curvature of the spherical portion 13b of the second lens 13 may be aligned or may be substantially aligned with the center axis of the inner periphery of the accommodation sleeve 15. Further, the second lens 13 is fixed to the another end side of the second lens holder 17, but is not directly fixed to the inner periphery of the accommodation sleeve 15, and hence even if the difference causes in thermal expansion amount or the contraction amount between the accommodation sleeve 15 and the second lens holder 17, such a stress causing the deviations in optical characteristics does not act on the second lens 13.

In this embodiment, the bandpass filter 14 as the optical functional component is fixed to the one end side of the second lens holder 17 by the adhesive. The band pass filter 14 opposes to the spherical portion 13b of the second lens 13 through the intermediation of the through hole 17a of the second lens holder 17, and also opposes to the spherical portion 12b of the first lens 12 through the intermediation of the through hole 16a of the first lens holder 16. Note that, the one end surface of the band pass filter 14 may be abutted on the another end surface of the first lens holder 16, and may also be apart from the another end surface. Alternatively, the band pass filter 14 may be fixed to both the second lens holder 17 and the first lens holder 16 by the adhesive.

Each of one end surface 15a and the another end surface 15b of the accommodation sleeve 15 is formed into a flat surface which forms a right angle with a center axis of an inner periphery of the accommodation sleeve 15. The perpendicularity thereof is controlled with a precision of ±0.5 degree or less, preferably ±0.1 degree or less with respect to a geometrically ideal flat surface in which the center axis of the inner periphery thereof serves as the normal line. Further, in the vertical sectional side surface illustrate in FIG. 1b, the flat surface portion 12a of the first lens 12 is in parallel to the end surface 15a of the accommodation sleeve 15, and the flat surface portion 13a of the second lens 13 is in parallel to the another end surface 15b of the accommodation sleeve 15.

The first capillary tube assembly 2 and the lens assembly 4 are fixed to each other by the adhesive under a state in which the one end surface 7a of the retaining sleeve 7 and the one end surface 15a of the accommodation sleeve 15 are abutted on each other. The second capillary tube assembly 3 and the lens assembly 4 are fixed to each other by the adhesive under a state in which the end surface 11a of the retaining sleeve 11 and the another end surface 15b of the accommodation sleeve 15 are abutted on each other. In this case, two retaining sleeves 7 and 11 are arranged coaxially, but in a cross sectional plan view illustrated in FIG. 1a, the center axes of the retaining sleeves 7 and 11 are offset with respect to the center axis of the accommodation sleeve 15 by an offset amount of Δa of the center axis of the first lens 12 and the second lens 13. As a result, the center axes of the retaining sleeve 7 and the retaining sleeve 11 become substantially coincide with each other. With this structure, the flat surface portion 12a of the first lens 12 properly opposes to the leading end surface 5a of the optical fiber 5 of the first capillary tube assembly 2 through a space, and the flat surface portion 13a of the second lens 13 properly opposes to the leading end surfaces 8a and 9a the optical fibers 8 and 9 of the second capillary tube assembly through a space.

The optical device 1 of this embodiment may be assembled as described below.

First, the second lens 13 and the band pass filter 14 are fixed to the second lens holder 17 by the adhesive in the above-mentioned mode to produce an assembly body formed of those three components. Then, the flat surface portion 13a of the second lens 13 and the end surface of the second lens holder 17 (end surface of which perpendicularity with respect to the center axis is controlled) are fixed so as to be inclined by a predetermined angle α in the cross sectional plan view of FIG. 1a, and also to be parallel or substantially parallel to each other in the vertical sectional side view of FIG. 1b, by appropriately pressing using a positioning jig. Then, the assemble body is inserted into the inner periphery of the accommodation sleeve 15, and after the adjustment of the position, the outer periphery of the second lens holder 17 is fixed to the inner periphery of the accommodation sleeve 15 by the adhesive. Note that, the outer diameter of the second lens holder 17 and the inner diameter of the accommodation sleeve 15 are substantially made coincide with each other so that the second lens holder 17 of the assemble body may be smoothly inserted into the inner periphery of the accommodation sleeve 15 (clearance between the outer periphery of the second lens holder 17 and the inner periphery of the accommodation sleeve 15 is made as small as possible). By taking such a structure, in the vertical sectional side view of FIG. 1b, the above-mentioned assembly body may be fixed to the accommodation sleeve 15 so that the flat surface portion 13a of the second lens 13 is in parallel with the another end surface 15b of the accommodation sleeve 15, and is perpendicular or close to perpendicular to the center axis of the inner periphery of the accommodation sleeve. In addition, in the cross sectional plan view of FIG. 1a, the above-mentioned assembly body may be fixed to the accommodation sleeve 15 so that the flat surface portion 13a of the second lens 13 is inclined by a predetermined angle α, or close thereto. Further, by the control of the coaxiality between the outer periphery of the second lens holder 17 and the center of the through hole 17a, and the perpendicularity between the end surface and the outer periphery, the center curvature of the spherical portion 13b of the second lens 13 may be aligned or substantially aligned with the center axis of the inner periphery of the accommodation sleeve 15.

Next, the first lens 12 is fixed to the first lens holder 16 by the adhesive in the above-mentioned mode to produce an assembly body formed of those two components. Then, in the vertical sectional side view of FIG. 1b, the flat surface portion 12a of the first lens 12 and the end surface of the first lens holder 16 (end surface of which perpendicularity with respect to the center axis is controlled) are fixed so as to be parallel or substantially parallel to each other, and are fixed, in the cross sectional plan view of FIG. 1a, so that the flat surface portion 12a of the first lens 12 and the end surface of the first lens holder 16 are inclined by the predetermined angle α, by appropriately using a positioning jig including a wedge shape jig, or the like. Then, the assemble body is inserted into the inner periphery of the accommodation sleeve 15, and after the adjustment of the position, the outer periphery of the first lens holder 16 is fixed to the inner periphery of the accommodation sleeve 15 by the adhesive. Note that, the outer diameter of the first lens holder 16 and the inner diameter of the accommodation sleeve 15 are substantially made coincide with each other so that the first lens holder 16 of the assemble body may be smoothly inserted into the inner periphery of the accommodation sleeve 15 (clearance between the outer periphery of the first lens holder 16 and the inner periphery of the accommodation sleeve 15 is made as small as possible). With taking such a structure, in the cross sectional plan view of FIG. 1a, the above-mentioned assembly body may be fixed to the accommodation sleeve 15 so that the flat surface portion 12a of the first lens 12 is inclined by the predetermined angle α, or close thereto, and in the vertical sectional side view of FIG. 1b, the flat surface portion 12a of the first lens 12 is in parallel with the one end surface 15a of the accommodation sleeve 15, and is perpendicular or close to perpendicular to the center axis of the inner periphery of the accommodation sleeve. In addition, as described above, by the control of the coaxiality between the outer periphery of the first lens holder 16 and the center of the through hole 16a, and the perpendicularity between the end surface and the outer periphery, the center curvature A of the spherical portion 12b of the first lens 12 may be aligned or substantially aligned with the center axis of the inner periphery of the accommodation sleeve 15.

Next, on the another end surface 15b of the accommodation sleeve 15 to which the above-mentioned assembly is fixed, the one end surface 11a of the retaining sleeve 11 of the first capillary tube assembly 3 is abutted, and relative positions of those are adjusted in directions (X-axis and Y-axis directions) perpendicular to an optical axis direction (Z-axis direction) of the optical fibers 8 and 9, while taking the above-mentioned offset amount Δa into consideration. At the same time, in the abutted retaining sleeve 11 of the secondary capillary tube assembly 3, the capillary tube 10 is moved in the optical axis direction (Z-axis direction), thereby adjusting the positions of the leading end surfaces 8a and 9a of the optical fibers 8 and 9 fixed to the capillary tube 10. Then, for example, adhesion and fixation are performed in an optimum optical alignment state such that, for example, light output from the optical fiber 8 on one side is reflected by the band pass filter 14, and is returned to the optical fiber 9 on another side.

Further, on one end surface 15a of the accommodation sleeve 15 to which the above-mentioned assembly is fixed, the one end surface 7a of the retaining sleeve 7 of the first capillary tube assembly 2 is abutted, and relative positions of those are adjusted in directions (X-axis and Y-axis directions) perpendicular to an optical axis direction (Z-axis direction) of the optical fiber 5, while taking the above-mentioned offset amount Δa into consideration. At the same time, in the abutted retaining sleeve 7 of the first capillary tube assembly 2, the capillary tube 6 is moved in the optical axis direction (Z-axis direction), thereby adjusting a position of the leading end surface 5a of the optical fiber 5 fixed to the capillary tube 6.

Then, for example, adhesion and fixation are performed in an optimum optical alignment state such that, for example, light output from the optical fiber 8 on one side of the second capillary tube assembly 3 passes through the band pass filter 14, and is entered into the optical fiber 5.

In an assembling method for the optical device 1 described above, when all components constituting the optical device 1 is made of a transparent material (for example, resin or glass), a UV-curing adhesive may be used as the adhesive, thereby improving an operability of an assembling operation. Further, in the adhesion between the retaining sleeve 7 (11) and the capillary tube 6(10), and/or the adhesion between the capillary tube assembly 2(3) and the lens assembly 4, after temporal fixation is performed by the UV-curing adhesive, the fixation may be performed by a thermosetting adhesive with higher reliability.

Next, a description is made of a use example of the optical device 1 according to this embodiment (use example as an optical demultiplexer).

For example, light of relatively different wavelengths λ1 and λ2 are output from the optical fiber 8 on the one side of the second capillary tube assembly 3. The band pass filter 14 has optical characteristics allowing reflection of the light of wavelength λ1 and passage of the light of wavelength λ2. The light of wavelength λ1 output from the optical fiber 8 of the second capillary tube assembly 3 is collimated into parallel light by the second lens 13 and is reflected by the band pass filter 14. The light of wavelength λ1 reflected by the band pass filter 14 is collected by the second lens 13 and is returned to the optical fiber 9 on another side of the second capillary tube assembly 3. On the other hand, the light of wavelength λ2 output from the optical fiber 8 of the second capillary tube assembly 3 is collimated into parallel light by the second lens 13 and inputs the band pass filter 14. Then, the light passes through the bandpass filter 14 and is collected by the first lens 12 to input into the optical fiber 5 of the first capillary tube assembly 2.

Figure 3A:
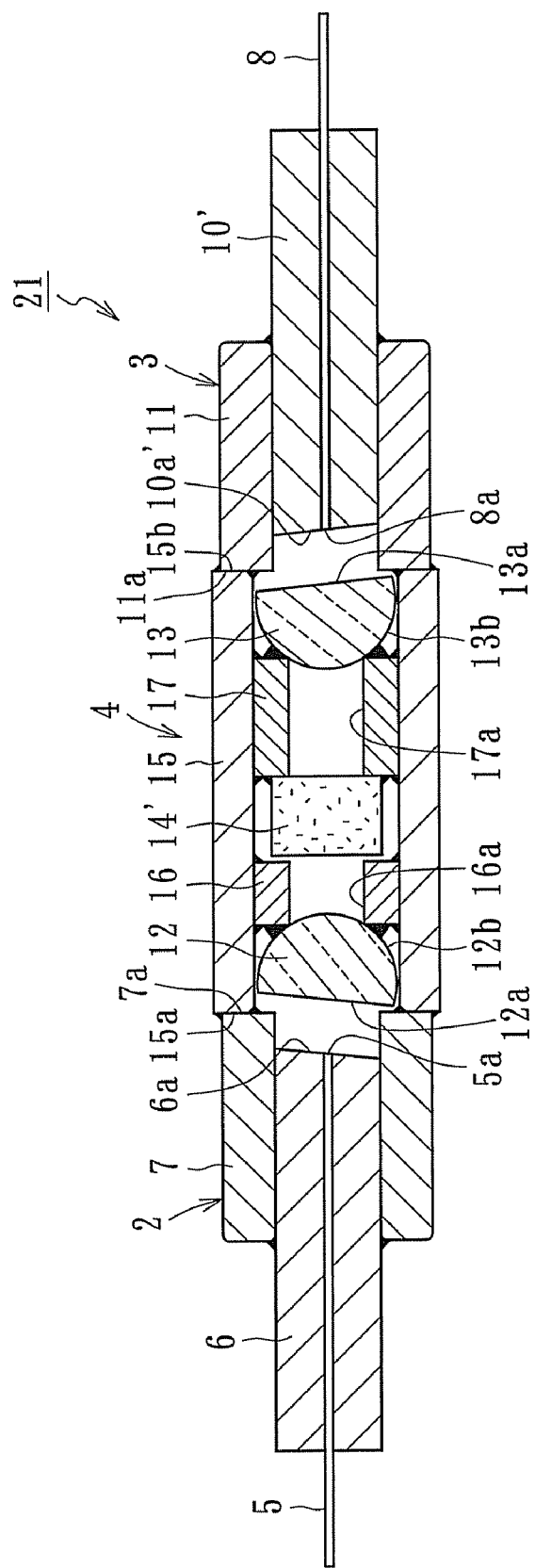
FIG. 3a A cross sectional plan view illustrating a schematic structure of an optical device according to a second embodiment of the present invention.
Figure 3B:
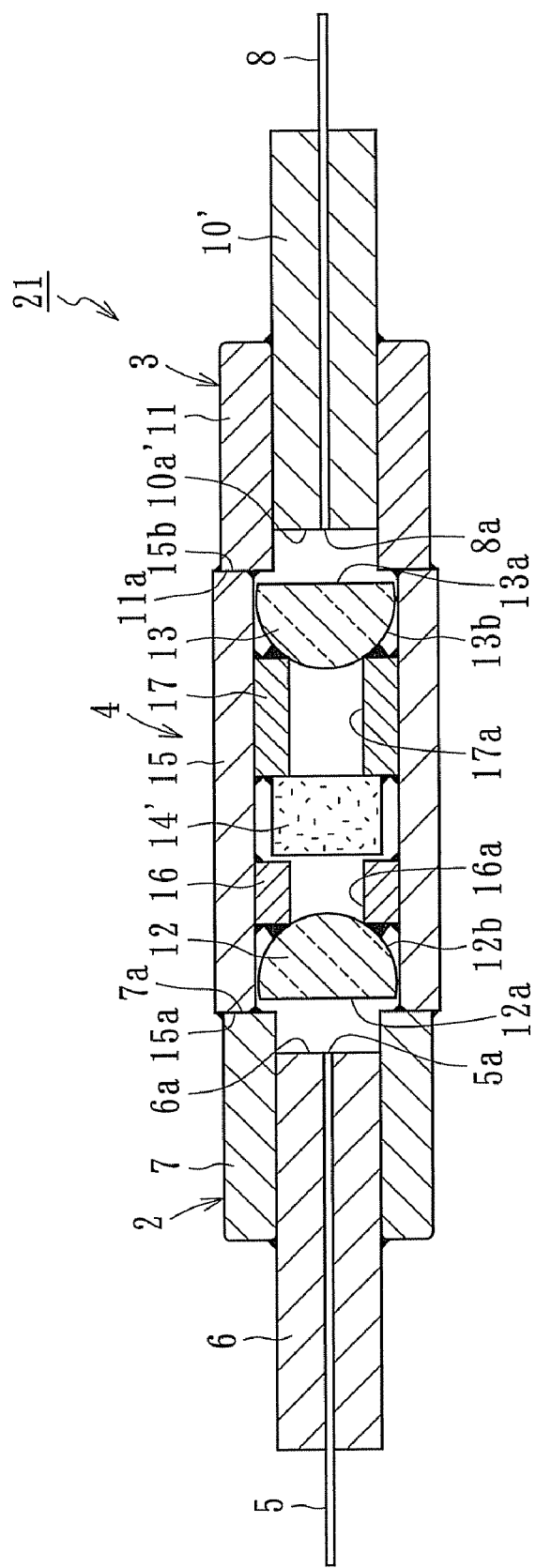
FIG. 3b A vertical sectional side view illustrating a schematic structure of the optical device according to the second embodiment of the present invention.

FIG. 3a is a cross sectional plan view illustrating a schematic structure of an optical device 21 according to a second embodiment of the present invention, and FIG. 3b is a vertical sectional side view of the same. It should be noted that the substantially same components and portions with the optical device 1 according to the first embodiment described above are denoted by the same reference numerals, and duplicate description thereof is omitted.

The optical device 21 of this embodiment substantially differs from the optical device 1 of the first embodiment in that the single core collimators are combined with each other, and the isolator core 14' is used as the optical functional component.

In the first capillary tube assembly 2, the one optical fiber 5 is fixed by the adhesive to the inner hole of the single core of the capillary tube 6, and in the second capillary tube assembly 3, the one optical fiber 8 is fixed by the adhesive to the inner hole of the single core 1 of the capillary tube 10'. Besides, the isolator core 14' as the optical functional component is fixed by the adhesive to the one end side of the second lens holder 17. Other matters correspond to the optical device 1 of the first embodiment, and hence duplicate description thereof is omitted.

Figure 4A:
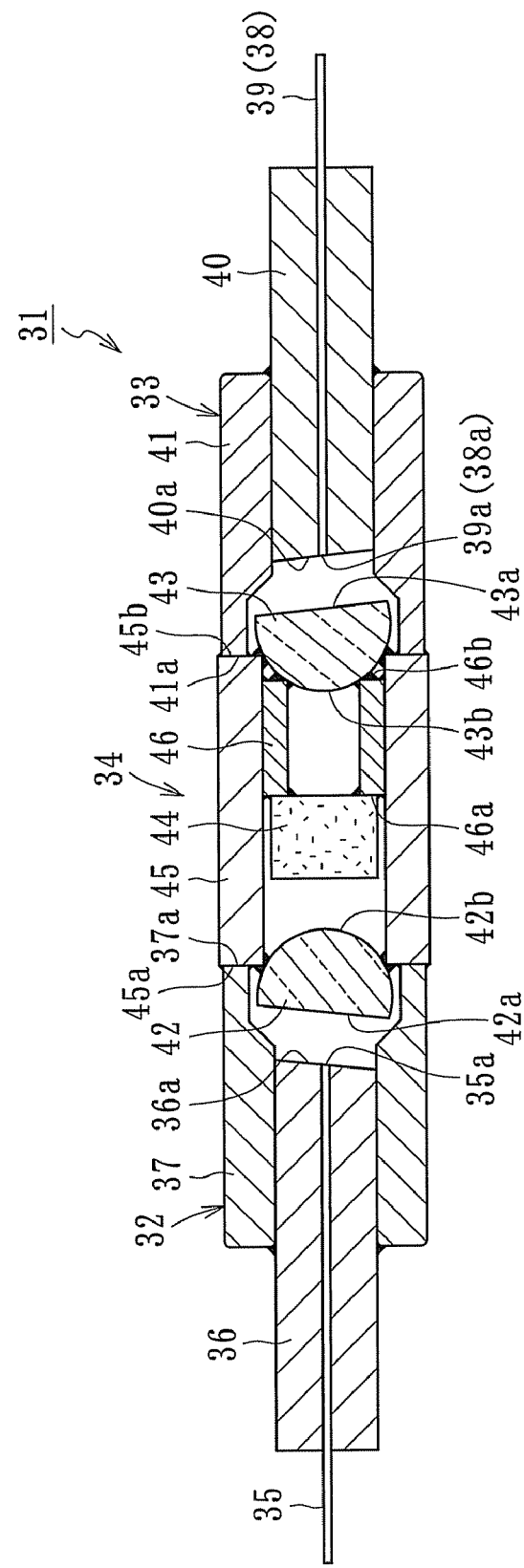
FIG. 4a A cross sectional plan view illustrating a schematic structure of an optical device according to a third embodiment of the present invention.
Figure 4B:
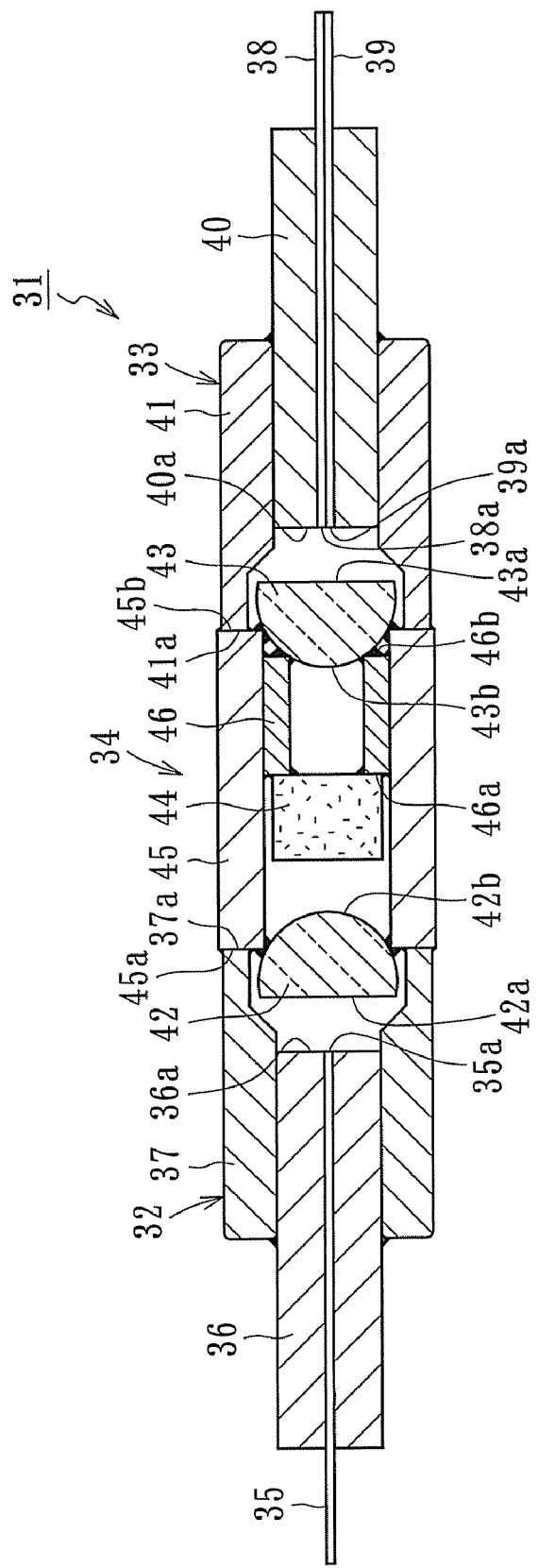
FIG. 4b A vertical sectional side view illustrating a schematic structure of the optical device according to the third embodiment of the present invention.

FIG. 4a is a cross sectional plan view illustrating a schematic structure of an optical device 31 according to a third embodiment of the present invention, and FIG. 4b is vertical sectional side view of the same. The optical device 31 also includes a first capillary tube assembly 32, a second capillary tube assembly 33, and a lens assembly 34 as main components.

Then, the following points are also the same with the above-mentioned first embodiment: the first capillary tube assembly 32 includes a capillary tube 36 in which one optical fiber 35 is inserted and fixed in an inner hole of a single core, and a retaining sleeve 37 which is fixed to an outer periphery of the capillary tube 36; a leading end 35a of the optical fiber 35 and a leading end 36a of the capillary tube 36 are subjected to polishing to form the same inclined surfaces inclined with respect to the optical axis of the optical fiber 35; the second capillary tube assembly 33 includes a capillary tube 40 in which two optical fibers 38 and 39 are fixed to inner holes of two cores, respectively, and a retaining sleeve (retaining member) 41 which is fixed to an outer periphery of the capillary tube 40; and leading end surfaces 38a and 39a of the optical fibers 38 and 39 and a leading end surface 40a of the capillary tube 40 are subjected to form the same inclined surfaces inclined with respect to the optical axes of the optical fibers 38 and 39.

Further, the following point is also the same with the above-mentioned first embodiment: the lens assembly 34 includes a first lens 42 which is opposed to a leading end 35a of the optical fiber 35 of the first capillary tube assembly 32 through a space; a second lens 43 which is opposed to the leading end surfaces 38a and 39a of the optical fibers 38 and 39 of the second capillary tube assembly 33 through a space; an optical functional component, for example, an optical filter, in particular, a band pass filter 44 which is interposed between the first lens 42 and the second lens 43; and an accommodation sleeve 45 made of glass for accommodating those components.

In addition, the following points are also the same with the above-mentioned first embodiment: the first lens 42 and the second lens 43 are the hemispherical lenses; flat surface portions 42a and 43a thereof are inclined in a predetermined direction; and the center of curvature of spherical portions 42b and 43b are offset to a predetermined direction.

Then, in this fourth embodiment, under a state in which the spherical portion 42b is abutted on a one end-side opening edge portion of the accommodation sleeve 45, the first lens 42 is fixed to one end side of the accommodation sleeve 45 by the adhesive, and under a state in which the spherical portion 43b is abutted on an another end-side opening edge portion of the accommodation sleeve 45, the second lens 43 is fixed to another end side of the accommodation sleeve 45 by the adhesive.

The band pass filter 44 as the optical functional component is fixed to an inner peripheral surface of the accommodation sleeve 45 via the inner sleeve 46. The inner sleeve 46 is formed into a circular ring shape or a cylindrical shape by glass, metal, ceramics, or the like (by glass in this embodiment). Specifically, the inner sleeve 46 is fitted to the inner periphery of the accommodation sleeve 45, under a state in which the another end-side opening edge portion thereof is abutted on the spherical portion 43b of the second lens 43, and is fixed to the inner peripheral surface of the accommodation sleeve 45 by the adhesive. Note that, in this embodiment, the spherical portion 43b of the second lens is fixed to the another end-side opening edge portion of the inner sleeve 46 by the adhesive, but the fixation of this portion by the adhesive may be abolished. Then, the band pass filter 44 is fixed to a one end surface 46a of the inner sleeve 46 by the adhesive. In this state, the band pass filter 44 is constructed to oppose to the spherical portion 43b of the second lens 43 through an inner space of the inner sleeve 46, and also to the spherical portion 42b of the first lens 42 through an inner space of the accommodation sleeve 45. Specifically, respective distances among the first lens 42, the second lens 43, and the band pass filter 44 may simply be set with precision by controlling sizes in an axial direction of the accommodation sleeve 45 and the inner sleeve 46, respectively. Note that, there may take such a structure that the one end side opening portion of the inner sleeve 46 is fixed, under a state of being abutted on the spherical portion 42b of the first lens 42, to the inner peripheral surface of the accommodation sleeve 45 by the adhesive, and the band pass filter 44 is fixed to an another end surface 46b of the inner sleeve 46 by the adhesive.

The first capillary tube assembly 32 and the lens assembly 34 are fixed to each other by the adhesive under a state in which the one end surface 37a of the retaining sleeve 37 and a one end surface 45a of the accommodation sleeve 45 are abutted on each other. The second capillary tube assembly 33 and the lens assembly 34 are fixed to each other by the adhesive under a state in which the end surface 41a of the retaining sleeve 41 and the another end surface 45b of the accommodation sleeve 45 are abutted on each other. Note that, the inner peripheral surface of the retaining sleeve 37 of the first capillary tube assembly 32 is provided with a large diameter portion and a small diameter portion which is smaller in diameter than the large diameter portion in the stated order from the lens assembly 34 side. Then, the capillary tube 36 is inserted into and fixed to the small diameter portion. The first lens 42 is accommodated in the large diameter portion through a space. In the same manner, the inner peripheral portion of the retaining sleeve 41 of the second capillary tube assembly 33 is provided with a large diameter portion and a small diameter portion, and the capillary tube 40 is inserted into and fixed to the small diameter portion, and the second lens 43 is accommodated in the large diameter portion through a space.

The optical device 31 of this embodiment may be assembled as described below, for instance.

First, the second lens 43 is fixed by the adhesive to another end side of the accommodation sleeve 45 in the above-mentioned mode. After that, the inner sleeve 46, to which the bandpass filter 44 is adhered and fixed, is inserted into the inner periphery of the accommodation sleeve 45 from the another end side of the accommodation sleeve 45, and under a state in which the one end-side opening edge portion of the inner sleeve 46 is abutted on the spherical surface portion 43b of the second lens 43, the outer peripheral surface of the inner sleeve 46 is fixed by the adhesive to the inner peripheral surface of the accommodation sleeve 45. Note that, the inner sleeve 46 may be fixed by the adhesive only to the spherical surface portion 43b of the second lens 43. Further, in order to enable smooth insertion of the inner sleeve 46 into the inner periphery of the accommodation sleeve 45, an outer diameter of the inner sleeve 46 and an inner diameter of the accommodation sleeve 45 are set to be substantially equal to each other. Specifically, a clearance between the inner peripheral surface of the accommodation sleeve 45 and the outer peripheral surface of the inner sleeve 46 is set to be, for example, 0.030 mm or smaller, preferably, 0.015 mm or smaller.

Then, on the another end side of the accommodation sleeve 45, to which the second lens 43, the inner sleeve 46, and the bandpass filter 44 are fixed as described above, the first lens 42 is fixed by the adhesive in the above-mentioned mode, thereby being capable of manufacturing the lens assembly 34.

Next, on the another end surface 15b of the accommodation sleeve 45 to which the above-mentioned assembly is fixed, the one end surface 11a of the retaining sleeve 11 of the first capillary tube assembly 3 is abutted, and relative positions of those are adjusted in directions (X-axis and Y-axis directions) perpendicular to an optical axis direction (Z-axis direction) of the optical fibers 8 and 9. At the same time, in the abutted retaining sleeve 11 of the secondary capillary tube assembly 3, the capillary tube 10 is moved in the optical axis direction (Z-axis direction), thereby adjusting the positions of the leading end surfaces 8a and 9a of the optical fibers 8 and 9 fixed to the capillary tube 10. Then, for example, adhesion and fixation are performed in an optimum optical alignment state such that, for example, light output from the optical fiber 8 on one side is reflected by the band pass filter 14, and is returned to the optical fiber 9 on another side.

In addition, on the one end surface 45a of the accommodation sleeve 45 of the above-mentioned lens assembly 34, the one end surface 37a of the retaining sleeve 37 of the first capillary tube assembly 32 is abutted, and relative positions of those are adjusted in directions (X-axis and Y-axis directions) perpendicular to an optical axis direction (Z-axis direction) of the optical fiber 35. At the same time, in the abutted retaining sleeve 37 of the first capillary tube assembly 32, the capillary tube 36 is moved in the optical axis direction (Z-axis direction), thereby adjusting a position of the leading end surface 35a of the optical fiber 35 which is fixed to the capillary tube 36. Further, the capillary tube 36 is rotated so as to adjust the inclined direction of the leading end surface 35a inclined with respect to the optical axis of the optical fiber 35 which is fixed to the capillary tube 36. Adhesion and fixation are performed in an optimum optical alignment state so that, for example, light output from the optical fiber 38 on one side passes through the bandpass filter 44 is input to the optical fiber 35.

Figure 5A:
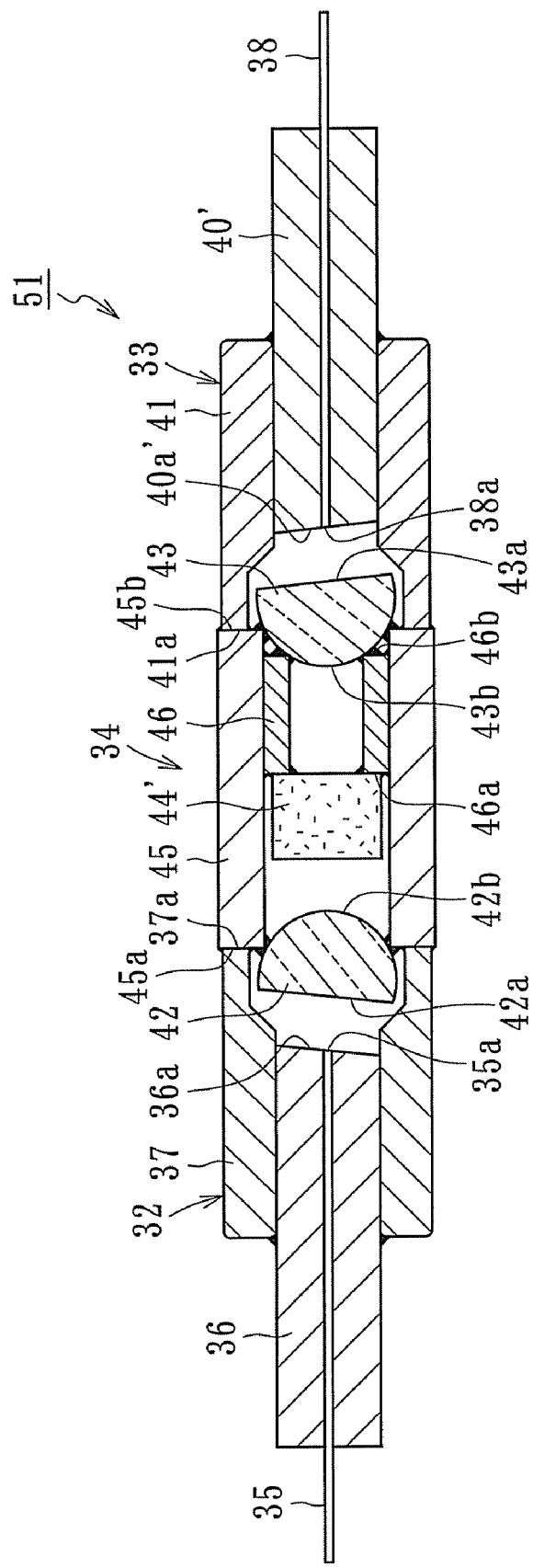
FIG. 5a A cross sectional plan view illustrating a schematic structure of an optical device according to a fourth embodiment of the present invention.
Figure 5B:
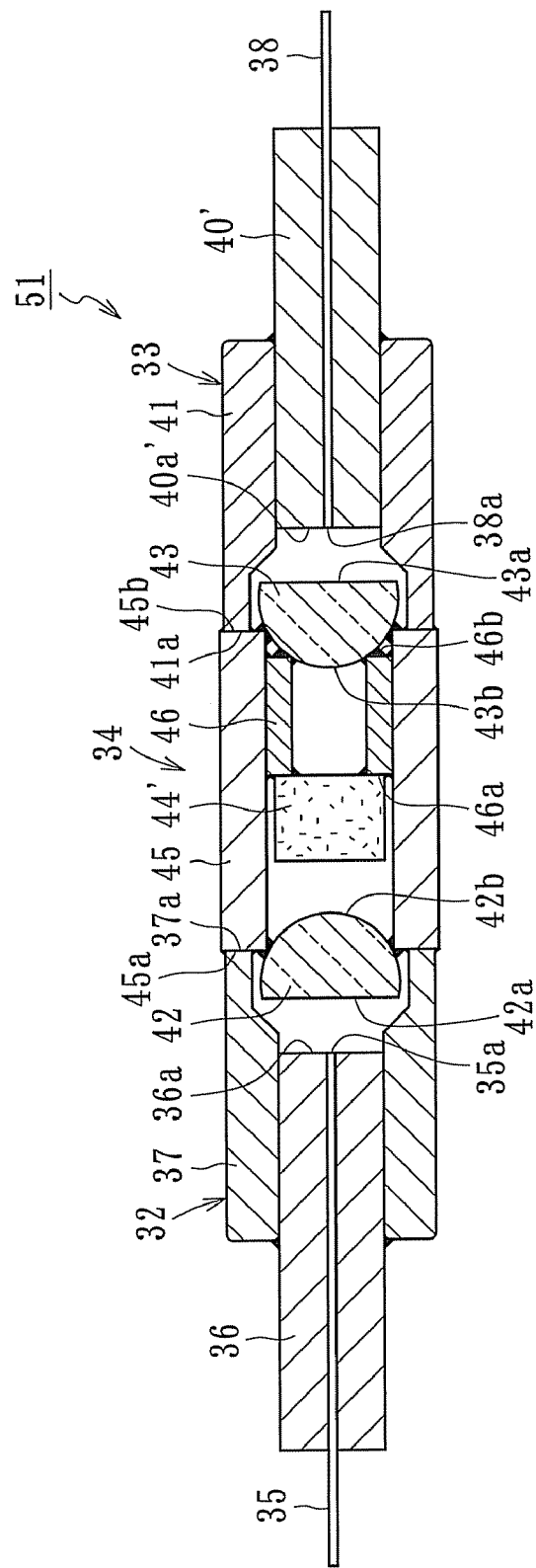
FIG. 5b A vertical sectional side view illustrating a schematic structure of the optical device according to the fourth embodiment of the present invention.

FIG. 5a is a cross sectional plan view illustrating a schematic structure of an optical device 51 according to a fourth embodiment of the present invention, and FIG. 5b is a vertical sectional side view of the same. It should be noted that the substantially same components and portions with the optical device 31 according to the second embodiment are denoted by the same reference numerals, and duplicate description thereof is omitted.

The optical device 51 of this embodiment substantially differs from the optical device 31 of the third embodiment in that the single core collimators are combined with each other, and the isolator core 44' is used as the optical functional component.

In the first capillary tube assembly 32, the one optical fiber 35 is fixed by the adhesive to the inner hole of the single core of the capillary tube 36, and in the second capillary tube assembly 33, the one optical fiber 38 is fixed by the adhesive to the inner hole of the single core 1 of the capillary tube 40'. Other matters conform to the optical device 31 of the third embodiment, and hence duplicate description thereof is omitted.

Figure 6A:
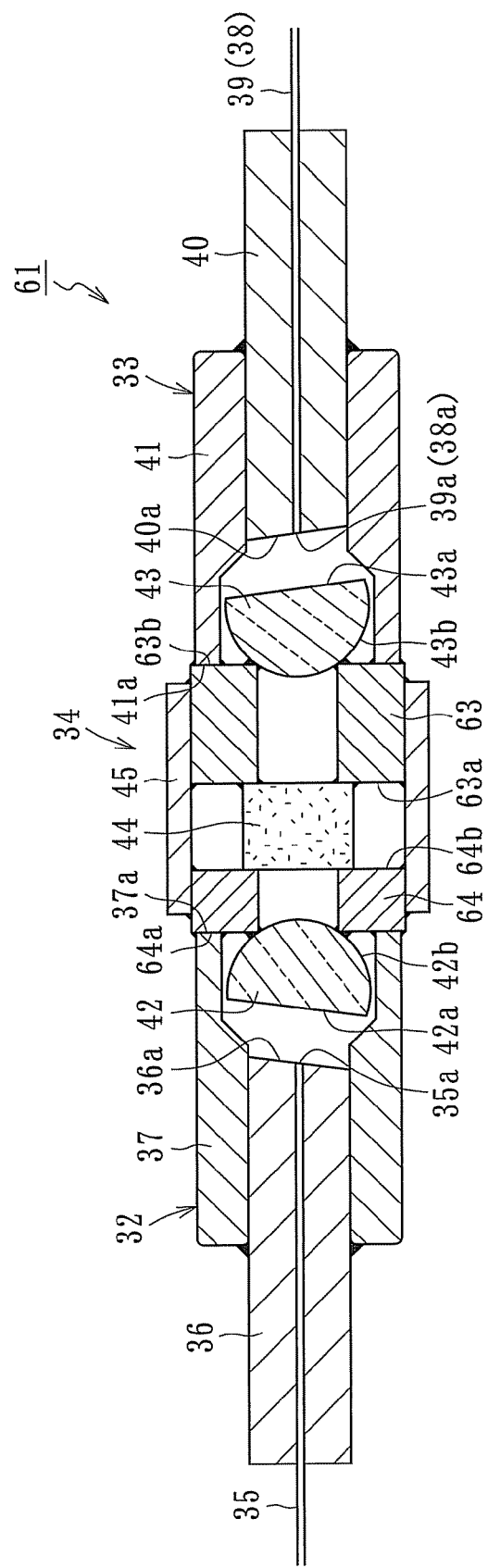
FIG. 6a A cross sectional plan view illustrating a schematic structure of an optical device according to a fifth embodiment of the present invention.
Figure 6B:
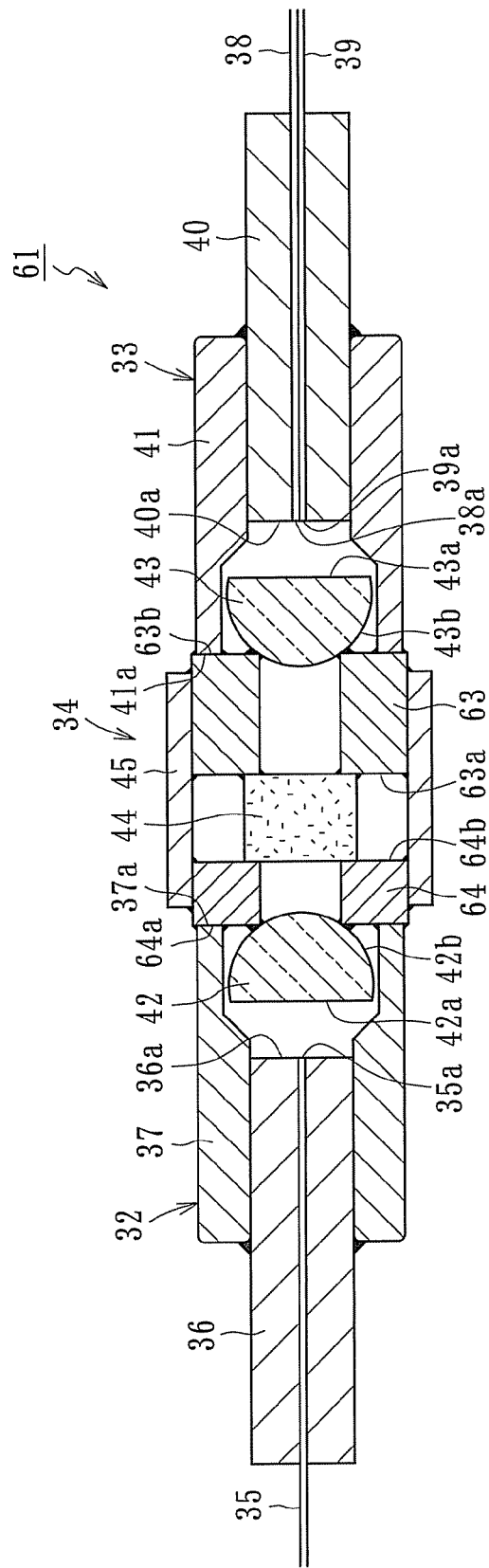
FIG. 6b A vertical sectional side view illustrating a schematic structure of the optical device according to the fifth embodiment of the present invention.

FIG. 6a is a cross sectional plan view illustrating a schematic structure of an optical device 61 according to a second embodiment of the present invention, and FIG. 6b is a vertical sectional side view of the same. It should be noted that the substantially same components and portions with the optical device 1 according to the third embodiment described above are denoted by the same reference numerals, and duplicate description thereof is omitted.

The optical device 61 according to this embodiment differs from the optical device 31 according to the third embodiment in structure of the lens assembly 34 and a method of fixing the first capillary tube assembly 32 and the second capillary tube assembly 33 to the lens assembly 34. Specifically, in the lens assembly 34, a first inner sleeve 64 and a second inner sleeve 63 are coaxially fitted and fixed to the inner periphery of the accommodation sleeve 45. Between an another end surface 64b of the first inner sleeve 64 and a one end surface 63a of the second inner sleeve 63, which are fitted and fixed to the inner periphery of the accommodation sleeve 45, a bandpass filter 44 is fixed under a state of being brought into contact with the respective end surfaces 64b and 63a. In this case, the band path filter 44 is fixed by the adhesive to at least one of the another end surface 64b of the first inner sleeve 64 and the one end surface 63a of the second inner sleeve 63 (In this embodiment, the bandpass filter 44 is fixed by the adhesive to the one end surface 63a of the second inner sleeve 63). The first lens 42 is fixed by the adhesive to one end side of the first inner sleeve 64 under a state in which the spherical surface portion 42b thereof is abutted on a one end-side opening edge portion of the first inner sleeve 64. The second lens 43 is also fixed by the adhesive to another end side of the second inner sleeve 63 under a state in which the spherical surface portion 43b thereof is abutted on an another end-side opening edge portion of the second inner sleeve 63. It should be noted that the following points are the same with the above-mentioned third embodiment: the flat surface portions 42a and 43a of the first lens 42 and the second lens 43 are inclined in a predetermined direction; and the center of curvature of spherical portions 42b and 43b are offset to a predetermined direction.

Further, a one end surface 64a of the first inner sleeve 64 and an another end surface 63b of the second inner sleeve 63 slightly protrude outwardly from both ends of the accommodation sleeve 45. Then, the retaining sleeve 37 in the first capillary tube assembly 32 is fixed by the adhesive to the one end surface 64a of the first inner sleeve 64. Further, the retaining sleeve 41 in the second capillary tube assembly 33 is fixed by the adhesive to the another end surface 63b of the second inner sleeve 63. Note that each of both the end surfaces 64a and 64b of the first inner sleeve 64 and both the end surfaces 63a and 63b of the second inner sleeve 63 is formed into a flat surface which forms a right angle with a center axis of an inner periphery of each of the first inner sleeve 64 and the second inner sleeve 63. Perpendicularity thereof is controlled with precision, for example, ±0.5 degree or less, preferably ±0.2 degree or less with respect to a geometrically ideal flat surface in which the center axis of the inner periphery of each of the first inner sleeve 64 and the second inner sleeve 63 is a normal line.

With taking this structure, the center of curvature of the spherical surface portion 42b of the first lens 42 may easily be made coincide with the center axis of the inner periphery of the first inner sleeve 64, and also the center of curvature of the spherical surface portion 43b of the second lens 43 may easily be made coincide with the center axis of the inner periphery of the second inner sleeve 63. Then, both the inner sleeves 623 and 64 are coaxially fitted and fixed to the inner periphery of the common accommodation sleeve 45, and hence the center of curvature of each of the spherical surface portions 42b and 43b of the first lens 42 and the second lens 43, respectively, may easily be made coincide with the center axis of the inner periphery of the accommodation sleeve 45. Further, the first lens 42, the second lens 43, and the bandpass filter 44 are continuous with each other in an axial direction through the intermediation of the first inner sleeve 64 and the second inner sleeve 24. Accordingly, by controlling axial dimensions of the first inner sleeve 64, the second inner sleeve 63, and the bandpass filter 44, respective intervals among the first lens 42, the second lens 43, and the bandpass filter 44 may easily be set with simply and precision.

It should be noted that the optical device 61 according to a fifth embodiment may have a structure in which only one optical fiber 38 of the second capillary tube assembly 33 is fixed by the adhesive in an inner hole of a single core of the capillary tube 40.

Figure 7A:
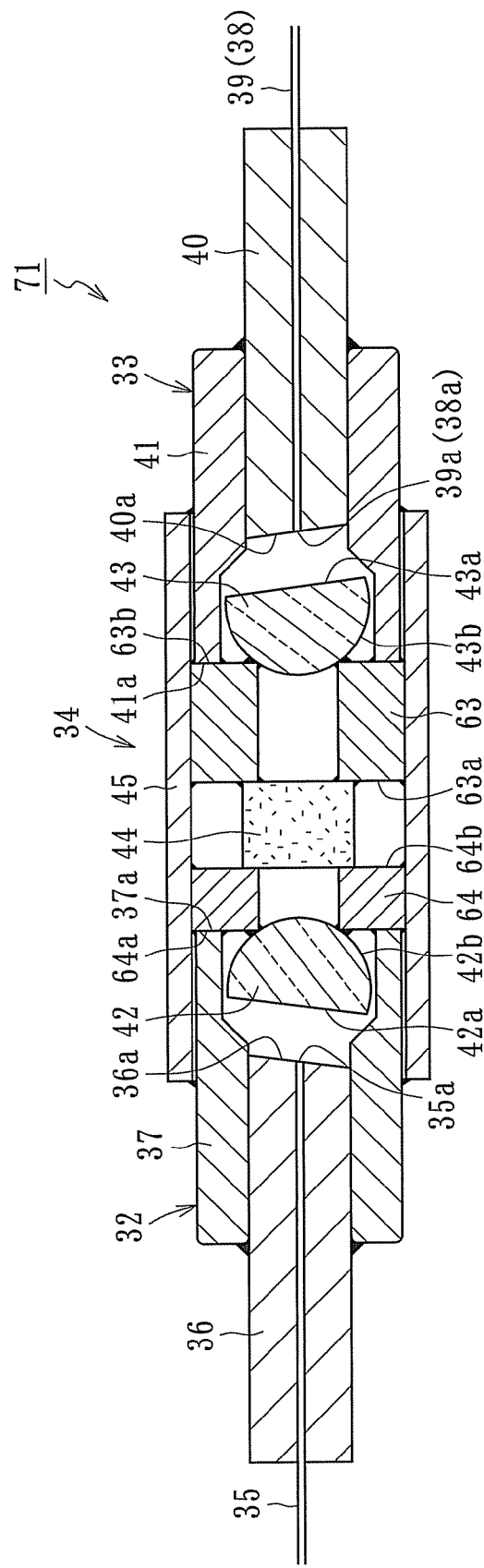
FIG. 7a A cross sectional plan view illustrating a schematic structure of an optical device according to a sixth embodiment of the present invention.
Figure 7B:
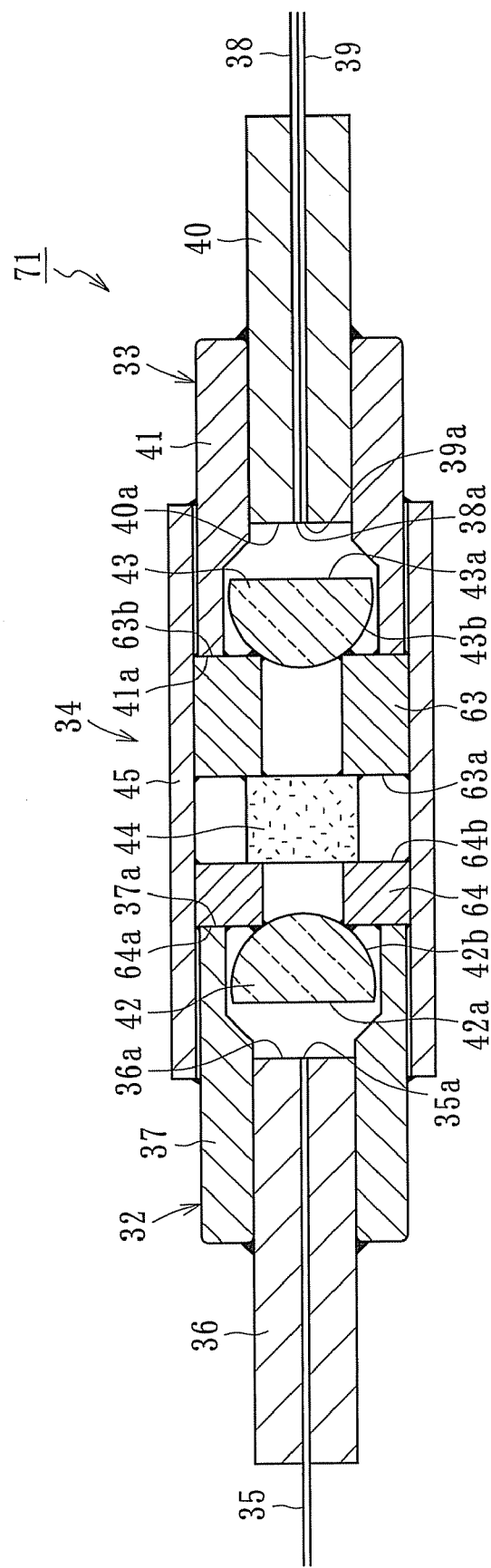
FIG. 7b A vertical sectional side view illustrating a schematic structure of the optical device according to the sixth embodiment of the present invention.

FIG. 7a is a cross sectional plan view illustrating a schematic structure of an optical device 71 according to a sixth embodiment of the present invention, and FIG. 7b is a vertical sectional side view of the same. It should be noted that the substantially same components and portions with the optical devices 31 and 61 according to the third and fifth embodiments are denoted by the same reference numerals, and duplicate description thereof is omitted.

The optical device 71 according to this embodiment differs from the optical device 61 according to the fifth embodiment in structure of the lens assembly 34. Specifically, a first difference resides in that the accommodation sleeve 45 is extended its length in an axial direction to completely accommodate the first inner sleeve 64 and the second inner sleeve 63 in the inner periphery of the accommodation sleeve 45. A second difference resides in that, under a state in which a leading end portion (end surface 37a on one side) of retaining sleeve 37 of the first capillary tube assembly 32 is inserted into the inner periphery of the accommodation sleeve 45, the leading end portion is fixed by the adhesive to a one end surface 64a of the first inner sleeve 64, and also, under a state in which a leading end portion (end surface 41a on one side) of the retaining sleeve 41 of the second capillary tube assembly 33 is inserted into the inner periphery of the accommodation sleeve 45, the leading end portion is fixed by the adhesive to another end surface 63b of the second inner sleeve 63. Note that, between the outer peripheral surface of each of the retaining sleeves 37 and 41 and the inner peripheral surface of the accommodation sleeve 45, there is formed a space (for example, space of about 0.125 mm to 0.25 mm) which enables adjustment of an optical alignment state between each of the capillary tube assemblies 32 and 33 and the lens assembly 34. Further, in this embodiment, in order to increase a fixation force and/or to further improve weatherability of the retaining sleeves 37 and 41, each of the retaining sleeves 37 and 41 is fixed by the adhesive to a part of the inner periphery of the accommodation sleeve 45.

Figure 8A:
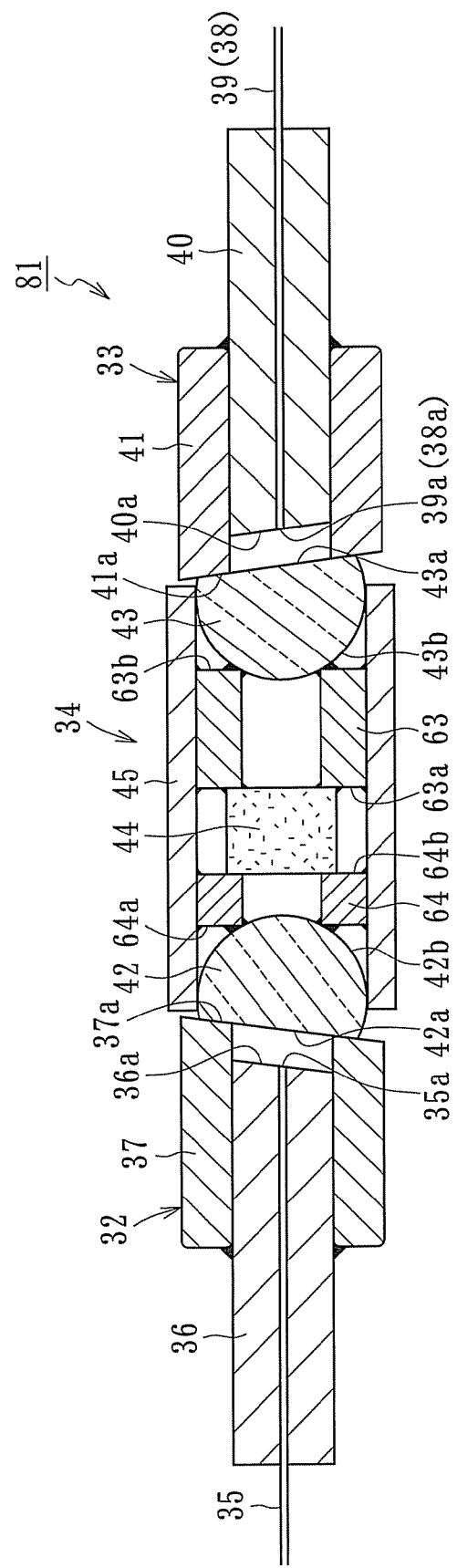
FIG. 8a A cross sectional plan view illustrating a schematic structure of an optical device according to a seventh embodiment of the present invention.
Figure 8B:
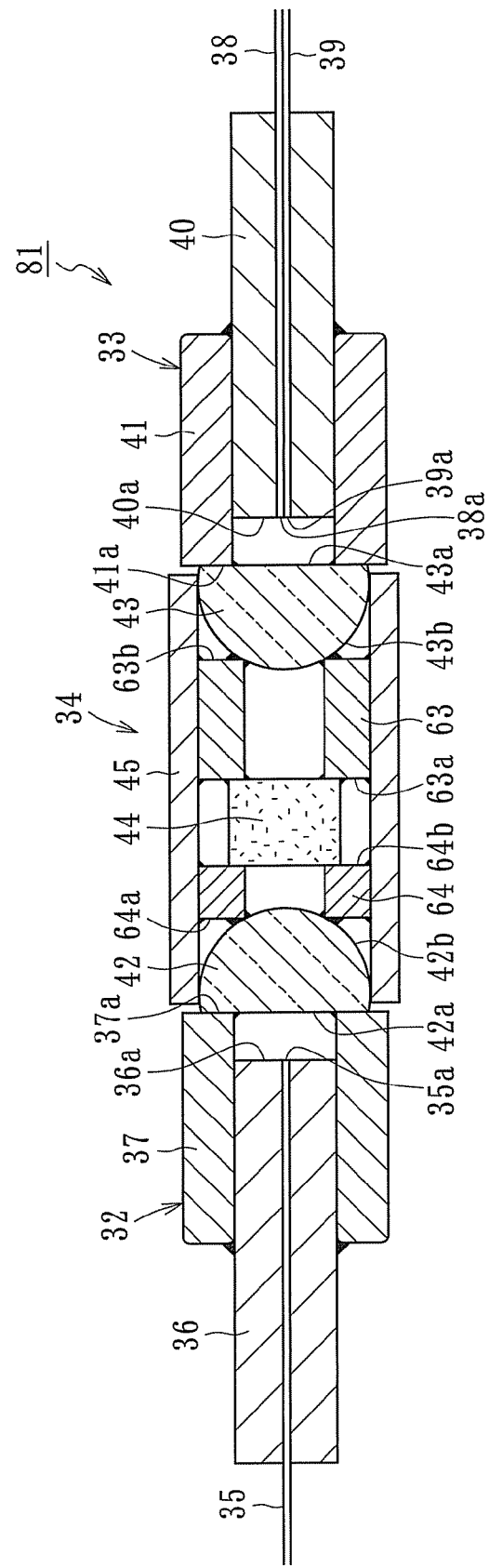
FIG. 8b A vertical sectional side view illustrating a schematic structure of the optical device according to the seventh embodiment of the present invention.

FIG. 8a is a cross sectional plan view illustrating a schematic structure of an optical device 81 according to a seventh embodiment of the present invention, and FIG. 8b is a vertical sectional side view of the same. It should be noted that the substantially same components and portions with the optical devices 61 and 71 according to the fifth and sixth embodiment are denoted by the same reference numerals, and duplicate description thereof is omitted.

The optical device 81 according to this embodiment differs from the optical devices 61 and 71 of the fifth and sixth embodiments of the present invention in structure of a lens assembly 34 and method of fixing the first capillary tube assembly 32 and the second capillary tube assembly 33 to the lens assembly 34. Specifically, a first difference resides in that the flat surface portion 42a of the first lens 42 and the flat surface portion 43a of the second lens 43 are allowed to slightly protrude outwardly from the both ends of the accommodation sleeve 45. Then, a second difference resides in that the end surface 37a on the one side of the retaining sleeve 37 of the first capillary tube assembly 32 is fixed by the adhesive to the inclined flat surface portion 42a of the first lens 42, and the end surface 41a on the one side of the retaining sleeve 41 of the second capillary tube assembly 33 is fixed by the adhesive to the inclined flat surface portion 43a of the second lens 43.

Figure 9A:
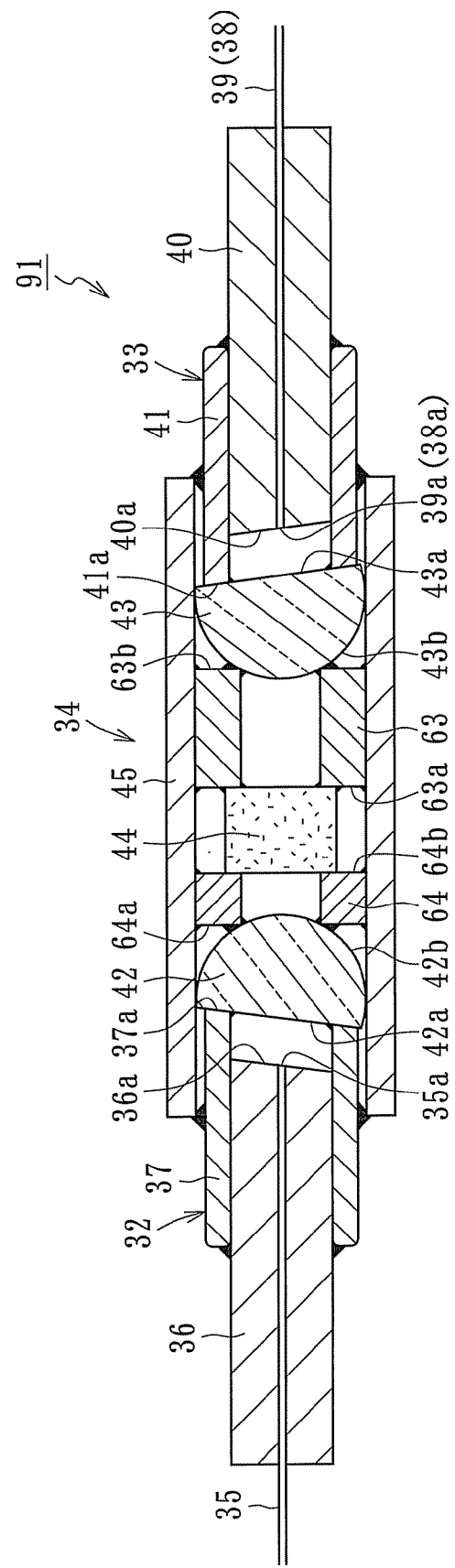
FIG. 9a A cross sectional plan view illustrating a schematic structure of an optical device according to an eighth embodiment of the present invention.

FIG. 9a is a cross sectional plan view illustrating a schematic structure of an optical device 91 according to an eighth embodiment of the present invention, and FIG. 9b is a vertical sectional side view of the same. It should be noted that the substantially same components and portions with the optical devices 71 and 81 according to the sixth and seventh embodiments are denoted by the same reference numerals, and duplicate description thereof is omitted.

The optical device 91 according to this embodiment differs from the optical devices 71 and 81 of the sixth and seventh embodiments of the present invention in structure of a lens assembly 34 and method of fixing the first capillary tube assembly 32 and the second capillary tube assembly 33 to the lens assembly 34. Specifically, a first difference resides in that the accommodation sleeve 45 is extended its length in an axial direction to completely accommodate the first lens 42 and the second lens 43 in the inner periphery of the accommodation sleeve 45. Then, a second difference resides in that, under a state in which a leading end portion (end surface 37a on one side) of retaining sleeve 37 of the first capillary tube assembly 32 is formed into an inclined end surface to be inserted into the inner periphery of the accommodation sleeve 45, the leading end portion is fixed by the adhesive to the inclined surface 42a of the first lens 42, and also, under a state in which a leading end portion (end surface 41a on one side) of the retaining sleeve 41 of the second capillary tube assembly 33 is formed into the inclined end surface to be inserted into the inner periphery of the accommodation sleeve 45, the leading end portion is fixed by the adhesive to the inclined flat surface portion 43a of the second inner lens 43. Note that, between the outer peripheral surface of each of the retaining sleeves 37 and 41 and the inner peripheral surface of the accommodation sleeve 45, there is formed a space (for example, space of about 0.125 mm to 0.25 mm) which enables adjustment of an optical alignment state between each of the capillary tube assemblies 32 and 33 and the lens assembly 34. Further, in this embodiment, in order to increase a fixation force and/or to further improve weatherability of the retaining sleeves 37 and 41, each of the retaining sleeves 37 and 41 is fixed by the adhesive to a part of the inner periphery of the accommodation sleeve 45.

It should be noted that, the optical device according to the third and fifth to eighth embodiments described above may take various variations, for example, there may be adopted a structure in which the optical isolator core is used as the optical functional component. Further, the retaining sleeve having a large diameter portion and a small diameter portion in the inner peripheral surface may be changed to a retaining sleeve having a substantially constant diameter. Contrary to this, the retaining sleeve having a substantially constant diameter may be changed to the retaining sleeve having a large diameter portion and a small diameter portion in the inner peripheral surface thereof.

The invention claimed is:

1. An optical device, comprising:
a first capillary tube assembly and a second capillary tube assembly each including a capillary tube into which a respective optical fiber is inserted and fixed, each of the capillary tubes being retained by a respective retaining member; and
a lens assembly which includes
a first lens and a second lens, each lens being opposed to a leading end of a respective one of the optical fibers of the first capillary tube assembly and the second capillary tube assembly through a space,
an optical functional component interposed between the first lens and the second lens, and
an accommodation member for accommodating the first lens, the second lens and the optical functional component, wherein:

each of the retaining members for retaining the first capillary tube assembly and the second capillary tube assembly is fixed to a respective end surface of the accommodation member;
each of the first lens and the second lens includes a spherical portion and a flat surface portion but does not include a columnar portion, and has a center of curvature of the spherical portion inside the spherical portion, the flat surface portion of each lens being provided under a state of opposing the leading end of the respective one of the optical fibers so as to be inclined with respect to an optical axis of the respective one of the optical fibers;
the center of curvature of the spherical portion of each lens is offset, in a direction along a straight line, which forms a right angle with the optical axis of the respective optical fiber, and which makes an inclined angle with respect to a flat surface portion maximum, from the optical axis of the respective optical fiber to a passing area side of a main light beam of input/output light with respect to the leading end of the respective optical fiber; and
a center axis of at least one of the retaining members is decentered with respect to a center axis of an inner periphery of the accommodation member in correspondence with the offset of the center of curvature of each of the spherical portions.

2. The optical device according to claim 1, wherein each optical fiber including the leading end which is opposed to the inclined flat surface portion of a respective lens and a leading end of the capillary tube into which the optical fiber is inserted and fixed, are inclined along an inclination of the flat surface portion of the respective lens.

3. The optical device according to claim 1, wherein the optical fiber of at least one capillary tube of the first capillary tube assembly and the second capillary tube assembly is a single optical fiber, and the lens which is opposed to the leading end of the single optical fiber through a space to be inclined, is constructed so that the main light beam of the input/output light with respect to the single optical fiber passes through the center of curvature of the spherical portion of the lens.

4. The optical device according to claim 1, wherein the optical fiber of at least one capillary tube of the first capillary tube assembly and the second capillary tube assembly comprises a plurality of optical fibers, and the lens which is opposed to the leading end of each of the plurality of optical fibers through a space to be inclined, is constructed so that a plurality of main light beams of the input/output light with respect to the plurality of optical fibers pass through the surroundings of the center of curvature of the spherical portion of the lens as a reference adjacently at same angle intervals.

5. The optical device according to claim 1, further comprising:
a first lens holder and a second lens holder accommodated in the accommodation member so as to be adjacent to the first lens and the second lens, respectively, each lens holder having a through hole, and each lens being fixed to the respective lens holder under a state in which the spherical portion of the lens is abutted on a first end side edge portion of the through hole of the respective lens holder.

6. The optical device according to claim 5, wherein the optical functional component is fixed to a second end side of one of the lens holders.

7. The optical device according to claim 5, wherein each lens holder is fixed to the accommodation member.

8. A lens assembly, comprising:
a lens;
a lens holder having a through hole; and
an accommodation member for accommodating the lens and the lens holder,
wherein the lens includes a spherical portion and a flat surface portion but does not include a columnar portion, and has a center of curvature of the spherical portion inside the spherical portion, the flat surface portion of the lens is inclined with respect to a center axis of an inner periphery of the accommodation member, and the lens is fixed to the lens holder under a state in which the spherical portion of the lens is abutted on a first end side edge portion of the through hole of the lens holder.

9. The lens assembly according to claim 8, wherein the lens is arranged so that the flat surface portion is in parallel with an end surface of the accommodation member.

10. The lens assembly according to claim 9, wherein the lens comprises a first lens and the lens holder comprises a first lens holder, the lens assembly further comprising:
a second lens; and
a second lens holder having a through hole,
wherein the second lens and the second lens holder are accommodated in the accommodation member and are sequentially adjacent to the optical functional component, the second lens includes a spherical portion and a flat surface portion but does not include a columnar portion, and has a center of curvature of the spherical portion inside the spherical portion, and the second lens is fixed to the second lens holder under a state in which the spherical portion of the second lens is abutted on an end side of the through hole of the second lens holder.

11. The lens assembly according to claim 10, wherein the second lens holder is fixed to the accommodation member.

12. The lens assembly according to claim 8, further comprising:
an optical functional component arranged so as to be adjacent to a second end side of the lens holder, the optical functional component being accommodated in the accommodation member.

13. The lens assembly according to claim 12, wherein the optical functional component is fixed to the second end side of the lens holder.

14. The lens assembly according to claim 8, wherein the lens holder is fixed to the accommodation member.

15. A lens assembly, comprising:
a first lens and a second lens;
an optical functional component; and
an accommodation member for accommodating the optical functional component,
wherein the first lens includes a spherical portion and a flat surface portion but does not include a columnar portion, and has a center of curvature of the spherical portion inside the spherical portion, the flat surface portion of the first lens is inclined with respect to a center axis of an inner periphery of the accommodation member, and the first lens is fixed to the accommodation member under a state in which the spherical portion of the first lens is abutted on an edge portion of an opening on a first end side of the accommodation member,
wherein the second lens includes a spherical portion and a flat surface portion but does not includes a columnar portion, and has a center of curvature of the spherical portion inside the spherical portion, the flat surface portion of the second lens is inclined so as to be symmetric with the flat surface portion of the first lens, and the second lens is fixed to the accommodation member under a state in which the spherical portion of the second lens is abutted on a second end side opening edge portion of the accommodation member.

16. The lens assembly according to claim 15, further comprising:
an inner sleeve fitted to the inner periphery of the accommodation member, the inner sleeve being fixed, under a state in which an edge portion of an opening on one end side of the inner sleeve is abutted on the spherical portion of either one of the first lens or the second lens, to at least one of an inner peripheral surface of the accommodation member and the spherical portion of the one of the first lens or the second lens, and the optical functional component being fixed to another end surface of the inner sleeve.

17. The lens assembly according to claim 15, wherein the first lens and the second lens each are produced by processing a part of a spherical lens into the flat surface portion.

18. An optical device comprising the lens assembly according to claim 15, wherein:
in the lens assembly, retaining members are fixed to first and second end surfaces of the accommodating member, respectively, each retaining member retaining a respective capillary tube into which a respective optical fiber is inserted and fixed; and
the center of curvature of the spherical portion of each of the first lens and the second lens is offset, in a direction along a straight line, which forms a right angle with an optical axis of a respective one of the optical fibers, and which makes an inclined angle with respect to a flat surface portion maximum, from the optical axis to a passing area side of a main light beam of input/output light with respect to a leading end of the respective one of the optical fibers.

19. The optical device according to claim 18, wherein each optical fiber including the leading end which is opposed to the inclined flat surface portion of a respective lens and a leading end of the capillary tube into which the optical fiber is inserted and fixed, are inclined along an inclination of the flat surface portion of the respective lens.

20. The optical device according to claim 18, wherein the optical fiber of at least one capillary tube of the two capillary tubes is a single optical fiber, and the lens which is opposed to the leading end of the single optical fiber, is constructed so that the main light beam of the input/output light with respect to the single optical fiber passes through the center of curvature of the spherical portion of the lens.

21. The optical device according to claim 18, wherein the optical fiber of at least one capillary tube of the two capillary tubes comprises a plurality of optical fibers, and the lens which is opposed to the leading end of each of the plurality of optical fibers through a space to be inclined, is constructed so that a plurality of main light beams of the input/output light with respect to each of the plurality of optical fibers pass through the surroundings of the center of curvature of the spherical portion of the lens as a reference adjacently at the same angle intervals.

22. The optical device according to claim 18, wherein a center axis of at least one of the two retaining members is decentered with respect to a center axis of the accommodation member in correspondence with the offset of the center of curvature of each of the spherical portions.

23. The optical device according to claim 18, wherein the first lens and the second lens each are produced by processing a part of a spherical lens into the flat surface portion.

24. A lens assembly, comprising:
a first lens and a second lens;
a first inner sleeve and a second inner sleeve;
an optical functional component; and
an accommodation member for accommodating at least the first inner sleeve, the second inner sleeve, and the optical functional component, wherein:
the first inner sleeve and the second inner sleeve are each coaxially fit-fixed to inner peripheries of the accommodation member under a state in which the optical functional component is interposed in a space between respective first end surfaces of the first and second sleeves which are opposed to each other;
the first lens includes a spherical portion and a flat surface portion but does not include a columnar portion, and has a center of curvature of the spherical portion inside the spherical portion, the flat surface portion of the first lens is inclined with respect to a center axis of an inner periphery of the accommodation member, and the first lens is fixed to the first inner sleeve under a state in which the spherical portion of the first lens is abutted on an edge portion of an opening on a second end side of the first inner sleeve; and
the second lens includes a spherical portion and a flat surface portion but does not include a columnar portion, and has a center of curvature of the spherical portion inside the spherical portion, the flat surface portion of the second lens is inclined so as to be symmetric with the flat surface portion of the first lens, and the second lens is fixed to the second inner sleeve under a state in which the spherical portion of the second lens is abutted on a second end side opening edge portion of the second inner sleeve.

25. The lens assembly according to claim 24, wherein the first inner sleeve, the second inner sleeve, and the optical functional component are communicated within the accommodation member.

26. An optical device comprising the lens assembly according to claim 24, wherein:
in the lens assembly, retaining members are fixed to first and second end surfaces of the accommodating member, respectively, each retaining member retaining a respective capillary tube into which a respective optical fiber is inserted and fixed; and
the center of curvature of the spherical portion of each of the first lens and the second lens is offset, in a direction along a straight line, which forms a right angle with an optical axis of a respective one of the optical fibers, and which makes an inclined angle with respect to a flat surface portion maximum, from the optical axis to a passing area side of a main light beam of input/output light with respect to a leading end of the respective one of the optical fibers.

27. An optical device comprising the lens assembly according to claim 24, wherein:
in the lens assembly, retaining members are fixed to the flat surface portions of the first lens and the second lens, respectively, each retaining member retaining a respective capillary tube into which a respective optical fiber is inserted and fixed; and
the center of curvature of the spherical portion of each of the first lens and the second lens is offset, in a direction along a straight line, which forms a right angle with an optical axis of a respective one of the optical fibers, and which makes an inclined angle with respect to a flat surface portion maximum, from the optical axis to a passing area side of a main light beam of input/output light with respect to a leading end of the respective one of the optical fibers.

28. The lens assembly according to claim 24, wherein the first lens and the second lens each are produced by processing a part of a spherical lens into the flat surface portion.

* * * * *